Figure 1:
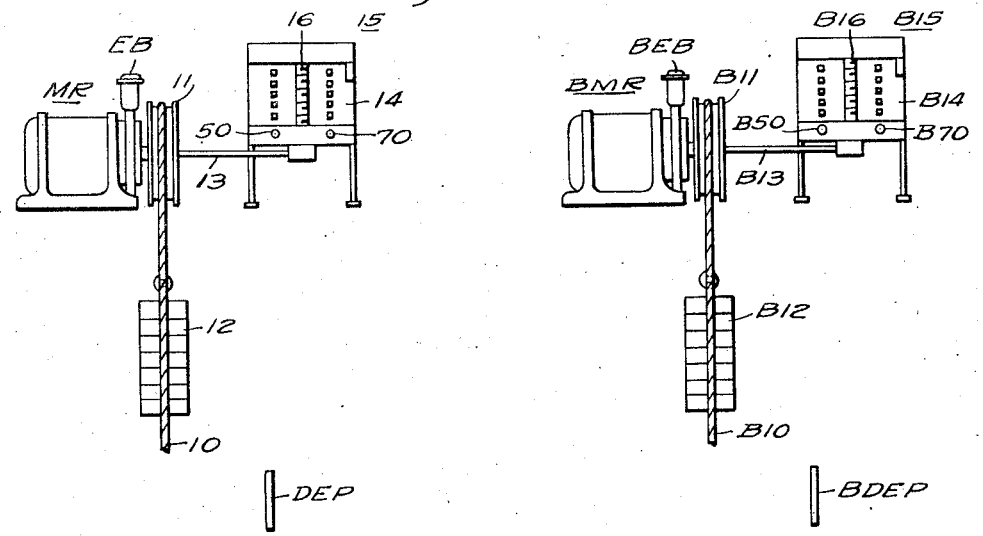
Figure 1:
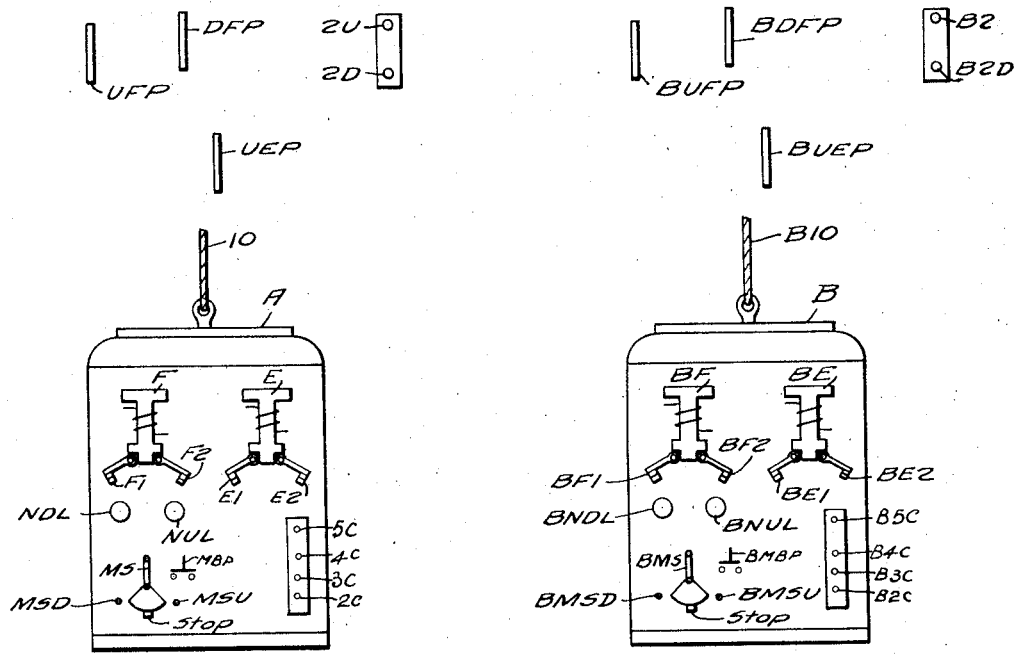

Jan. 7, 1941.    H. W. WILLIAMS ET AL    2,228,100
REVERSIBLE ELEVATOR SYSTEM
Filed May 28, 1938    13 Sheets-Sheet 1

WITNESSES:

INVENTORS
Harold W. Williams,
Danilo Santini and Richard W. Jones.
BY
ATTORNEY

Jan. 7, 1941. H. W. WILLIAMS ET AL 2,228,100
REVERSIBLE ELEVATOR SYSTEM
Filed May 28, 1938 13 Sheets-Sheet 5

Fig. 3A.

WITNESSES:
E. A. McCloskey
Wm. E. Groome

INVENTORS
Harold W. Williams,
Danilo Santini and Richard W. Jones
BY
S. O. Harrison
ATTORNEY

Fig. 4A.

Jan. 7, 1941.   H. W. WILLIAMS ET AL   2,228,100
REVERSIBLE ELEVATOR SYSTEM
Filed May 28, 1938   13 Sheets-Sheet 9

Fig. 5A.

WITNESSES:
E. A. McCloskey.
Nw. C. Groome

INVENTORS
Harold W. Williams,
Danilo Santini and Richard W. Jones.
BY
G. O. Harrison
ATTORNEY Patented Jan. 7, 1941

2,228,100

UNITED STATES PATENT OFFICE 2,228,100

REVERSIBLE ELEVATOR SYSTEM

Harold W. Williams, Englewood, and Danilo Santini, Tenafly, N. J., and Richard W. Jones, Evanston, Ill., assignors to Westinghouse Electric Elevator Company, Jersey City, N. J., a corporation of Illinois Application May 28, 1938, Serial No. 210,646

15 Claims. (Cl. 187—29)

Application Serial No. 264,562, filed March 28, 1939, is a division of this application.

Our invention relates to systems of control for electric elevators and more particularly to such systems in which a number of elevator cars, operating together as a bank, are controlled by passenger-operated push buttons located at the various floor landings. Although not limited thereto, our invention is particularly applicable to such elevator systems in which the elevator cars are driven at relatively high speeds by variable-voltage of other high-speed motive equipment and are automatically stopped at the floors by automatic landing equipment or equivalent apparatus. Such elevator systems provide the most efficient passenger service available and find their principal application in office buildings and other tall structures having a large number of floors and a relatively large volume of passenger traffic.

In such systems, in the absence of special control provisions which will be described, there is a tendency for the various elevator cars to distribute the building traffic unevenly, and, in the taller buildings, for the cars to become "bunched" and thus prevent reasonable uniformity of spacing between the cars.

These systems also tend to provide better service at certain floors than at others, particularly during the noon and evening rush periods, at which times a relatively large number of calls are registered at practically all floors of the building within a relatively short period of time. At such rush periods, each elevator car is filled to capacity by a relatively few stops, perhaps three or four. Considering a car leaving the upper terminal, such a car is usually required to make these few stops at the upper floors and so passes the lower floors without stopping. Because of the frequency with which calls are registered, the next car of the series is also filled to capacity by three or four stops at upper floors and so passes the lower floors without stopping. In the operation of these systems, therefore, the response to calls registered from lower floors of the building is delayed until most of the traffic from the upper floors has received attention.

In order to provide more uniform service throughout the building during heavy traffic peaks, the "quota system," for limiting the number of calls assigned to an individual car has been devised. In accordance with the quota principle, each car is normally assigned a zone of floors extending in advance of itself up to some point of reference such as the next car travelling in the same direction, or, if no car is in advance of it traveling in the same direction, up to the last car travelling in the opposite direction. All corridor calls for service in the corresponding direction of travel, registered at floors included in a car's zone, are assigned to the car as soon as registered, until a predetermined number, or quota, of calls is received. Upon receipt of its quota of calls, the car loses its zone and cannot accept any further calls until it reaches a terminal. The zone of a car which has accepted its quota of calls is transferred to the next following car, so that the zone of the latter extends from its own position, past the car having its quota, up to the next preceding car travelling in the same direction, or to some other reference point.

It has been found in practice that the quota system distributes the acceptance of calls between upper and lower floors satisfactorily during heavy traffic conditions, and this system provides a more uniform time interval between the operation of a push button and the stopping of a car in response thereto, throughout the entire range of floors served by the system. Because of this more uniform time interval, the percentage of stops which result in the picking up of a single passenger is decreased; the average number of passengers picked up per stop is increased; the average number of stops per trip is decreased; and the average number of trips for the system as a whole per unit time is increased, as compared to corresponding values for systems otherwise similar but lacking the quota feature.

We have found, however, that during the outgoing rush periods, such as in the evening and at noon, the down calls are registered so rapidly that in many cases a car receives its quota of down calls while it is still traveling in the up direction. In such a case, the down calls constituting the car's quota may all correspond to lower floors of the building, and the car may be travelling upward empty. The upward trip made by the car, above the highest call registered, to the upper terminal, as well as the downward trip from the upper terminal to the highest call registered, accordingly, are ineffective to transfer passengers and represent loss of operating time.

A similar loss of operating time may occur during the incoming morning rush, when, after taking a car load of passengers at the lower terminal, the car discharges its last passenger at the floor corresponding to the highest car call, and then proceeds upward, empty, to the upper terminal, before returning to the lower terminal. In such a case, the time required to operate the car between the floor corresponding to the highest car call and the upper terminal, in both directions, is wasted.

It is, accordingly, an object of our invention to provide a novel elevator system of the quota type, in which operation of a car on an upward trip, having its quota, is normally reversed at the floor corresponding to the highest call assigned to the car.

A further object of our invention is to provide a novel elevator system in which the cars normally operate to the upper terminal irrespective of the floors for which up calls are registered, but, in which, during periods of heavy incoming traffic, reversal of car direction may be effected at the highest registered call.

We are aware of various elevator systems of the prior art, in which the cars may, under certain conditions, on upward trips, reverse at the floor corresponding to the highest registered call. In all such systems, so far as we are aware, floor calls are not assigned to any particular car, as soon as registered, but remain answerable by any car until some one car approaches within a predetermined distance of the calling floor. These systems, although eliminating a considerable amount of empty car travel, may, under certain conditions so reduce the number of cars available to answer down calls at the upper floors, that inadequate service is provided at such floors. As an example of such conditions, the case will be considered where three cars are moving upward, no up hall calls are registered, and a large number of down hall calls, such as fifteen, is registered for floors above the position of the leading car moving upward. Under these conditions, in the prior art systems, the leading car will continue upward to the highest registered down hall call, but the trailing cars will reverse at some lower floor and start downward. The leading car may be filled at the highest three or four floors at which down calls are registered, but no service will be provided for the other registered down hall calls until the operator of the leading car operates a by-pass switch, or equivalent, which will then cause any car moving upward to continue to the highest down hall call remaining unanswered.

In the applicants' system, under similar initial conditions, the fifteen down calls will be immediately assigned to a number of different cars moving upward, and no car will be assigned more calls than its quota, or average number of calls which it can conveniently answer. For example, if the quota of each car is five calls, the fifteen down calls will be divided among the three cars moving upward. Each car will then continue upward to the floor corresponding to the highest call of its individual quota, and reverse at such call. It will be seen that under the specific conditions described, the applicants' system provides three cars to answer the fifteen down calls whereas the prior art systems provide only one car.

Other objects of our invention will become evident from the following detailed description taken in conjunction with the accompanying drawings, in which:

Figure 1 is a diagrammatic view showing the arrangement of two elevator cars A and B in a hatchway, and apparatus associated with the cars, Figs. 2 to 7, inclusive, are diagrammatic views showing the circuit connections of various electrical elements used in the practice of the invention. These figures may be assembled vertically, in numerical order, with Fig. 2 at the top to illustrate the circuit features of the invention.

Figs. 2A to 7A are diagrammatic views showing the mechanical relationship of the coils and contacts of various relays shown in Figs. 2 to 7, inclusive. Figs. 2A to 7A may be arranged beside the corresponding Figs. 2 to 7 inclusive, to facilitate location of the various coils and contacts. The coils and contacts of Figs. 2A to 7A are at approximately the same levels, from top to bottom of the figure, as the corresponding elements of Figs. 2 to 7.

In order to reduce circuit complications to a minimum, the control circuits for two cars A and B only, are shown herein. It will be understood, however, that similar circuits would be provided for each car of a bank, which might comprise, for example, six cars.

In order to eliminate unnecessary multiplication of parts for the various floors, the invention has been illustrated as applied to a bank of cars operating between first and fifth terminals. It will be obvious, however, that the system may be extended to include as many floors as desired.

Wherever possible, the apparatus which is individual to car B has been given the same reference character as the corresponding element of car A, with the exception that the prefix B is used to indicate that the apparatus is individual to car B. As the prefix B distinguishes the apparatus individual to car B from corresponding apparatus of car A, the prefix A has been omitted from the reference characters associated with car A in order to reduce the total of letters and figures making up each reference character used in the description.

The control apparatus individual to car A, which is duplicated for the other cars, such as car B, is listed below and the control apparatus common to cars A and B is listed in a separate schedule.

*Control apparatus individual to car A*

| | |
|---|---|
| V | High speed relay |
| U | Up direction switch |
| D | Down direction switch |
| M | Brake relay |
| G | Auxiliary relay |
| E | Slow-down inductor relay |
| F | Stopping indicator relay |
| W | Up direction preference relay |
| X | Down direction preference relay |
| 4DR<br>3DR<br>2DR | Down call storing relays |
| S | Stopping relay |
| 5DY<br>4DY<br>3DY<br>2DY | Down zoning relays |
| PU | Up pass relay |
| P | Pass relay |
| PD | Down pass relay |
| PX | Auxiliary pass relay |
| Q | Quota relay |
| DE | Down acceptance relay |
| UE | Up acceptance relay |
| TT | Upper terminal relay |
| LT | Lower terminal relay |
| MS | Master switch |
| MBP | Manual by-pass switch |

T    Auxiliary stopping relay
HCR    High call reverse relay
H    Call counting relay
NCU    No call up relay
NCD    No call down relay
FC    Floor counting relay
5P ⎫
4P ⎪
3P ⎬ Position relays
2P ⎪
1P ⎭
HCI    High call service relay
MHC    High call service switch
RS    Reverse signal relay

*Control apparatus common to all cars*

5DR    Upper terminal call storing relay
4UR ⎫
3UR ⎪
2UR ⎬ Up call storing relays
1UR ⎭
1UZ ⎫
2UZ ⎬ Up common zoning relays
1DZ ⎫
2DZ ⎬ Down common zoning relays

*Apparatus shown in Fig. 1 of the drawings*

Referring particularly to Fig. 1 of the drawings, it will be observed that car A is arranged to be supported in a hatchway by means of a cable 10 which is passed over a sheave 11 and is counterweighted by means of a counterweight 12. The sheave 11 is mounted for rotation with a shaft 13 which is driven by a motor MR. A brake EB of the usual spring-operated, electromagnetically-released type, is provided for stopping further rotation of the sheave 11 when the motor MR is deenergized.

A floor selector 15, of any suitable type, is provided for commutating various circuits of the system in accordance with the position of car A. As illustrated, the shaft 13 is extended and is arranged to operate a brush carriage 14 of the floor selector 15 by mechanically rotating a lead screw 16. The brush carriage 14 is provided with a number of moving brushes, each of which successively engages a row of stationary contacts, corresponding to the floors of the building, upon movement of the car. For simplicity, only two moving brushes 50 and 70 and the cooperating two rows of contacts are illustrated, but it will be understood that in the system illustrated, as well as in practice, a much larger number of brushes and rows of contacts is required. Other forms of selectors may also be used.

In order to effect accurate stopping of car A at floor level, a slow-down inductor relay E and a stopping inductor relay F are mounted upon the car in positions to cooperate with suitable inductor plates UEP, DEP, UFP, DFP of iron or other magnetic material, mounted in the hatchway. The inductor relays E and F have normally incomplete magnetic circuits which are successively completed by the inductor plates UEP, UFP, etc., as the car approaches floor level. These relays are so designed that energization of their operating coils will not produce contact operation except at such times as the relay is opposite an inductor plate, thereby completing the relay magnetic circuit. Upon operation of the relay contacts (such as E1 or E2) the contacts remain in operated condition until the relay operating coil is deenergized, even though the inductor relay moves away from a position opposite the inductor plate which completed its magnetic circuit. One pair of up inductor plates, such as UEP and UFP is provided for each floor except the lower terminal, and a pair of down inductor plates, similar to DEP and DFP, is provided for each floor except the upper terminal, the plates, of course, being properly spaced in the hatchway to provide desirable distances for slow down and stopping of the cars at the floors. Other methods of controlling slow down and stop of the car may be used if so desired.

In order to provide for registering calls at the floors, hall call buttons are provided at each floor, intermediate the terminals, one button being provided for each direction of travel. As illustrated, the second floor is provided with an up hall call button 2U and a down hall call button 2D. The other intermediate floors are similarly provided with hall call buttons, and a single button is provided at the terminal floors.

In order to start car A in either direction, a master switch MS is provided within the car in a position convenient for control by the operator. The master switch MS includes an energizing segment which normally stands in a central position but is operable to either of two starting positions, the first in engagement with up contact member MSU for starting car A in the up direction, and the second in engagement with down contact member MSD for starting car A in the down direction. During ordinary operation, the master switch MS is moved to the proper up or down starting position and held in such position until the operator feels the car decelerating at which time the switch is centered. If at any time the operator wishes to make an automatic stop at the next floor in advance of the car, he may do so by centering the master switch MS.

Dispatching lights are also provided in the elevator car which indicate to the operator when his car is next to leave a terminal and when it is to start from a terminal. For this purpose, next up light NUL is provided for signalling operation away from the bottom terminal, and the next down light NDL is provided for signalling operation away from the top terminal and for signalling reversal of the car at the floor corresponding to the highest registered call.

Figure 2:
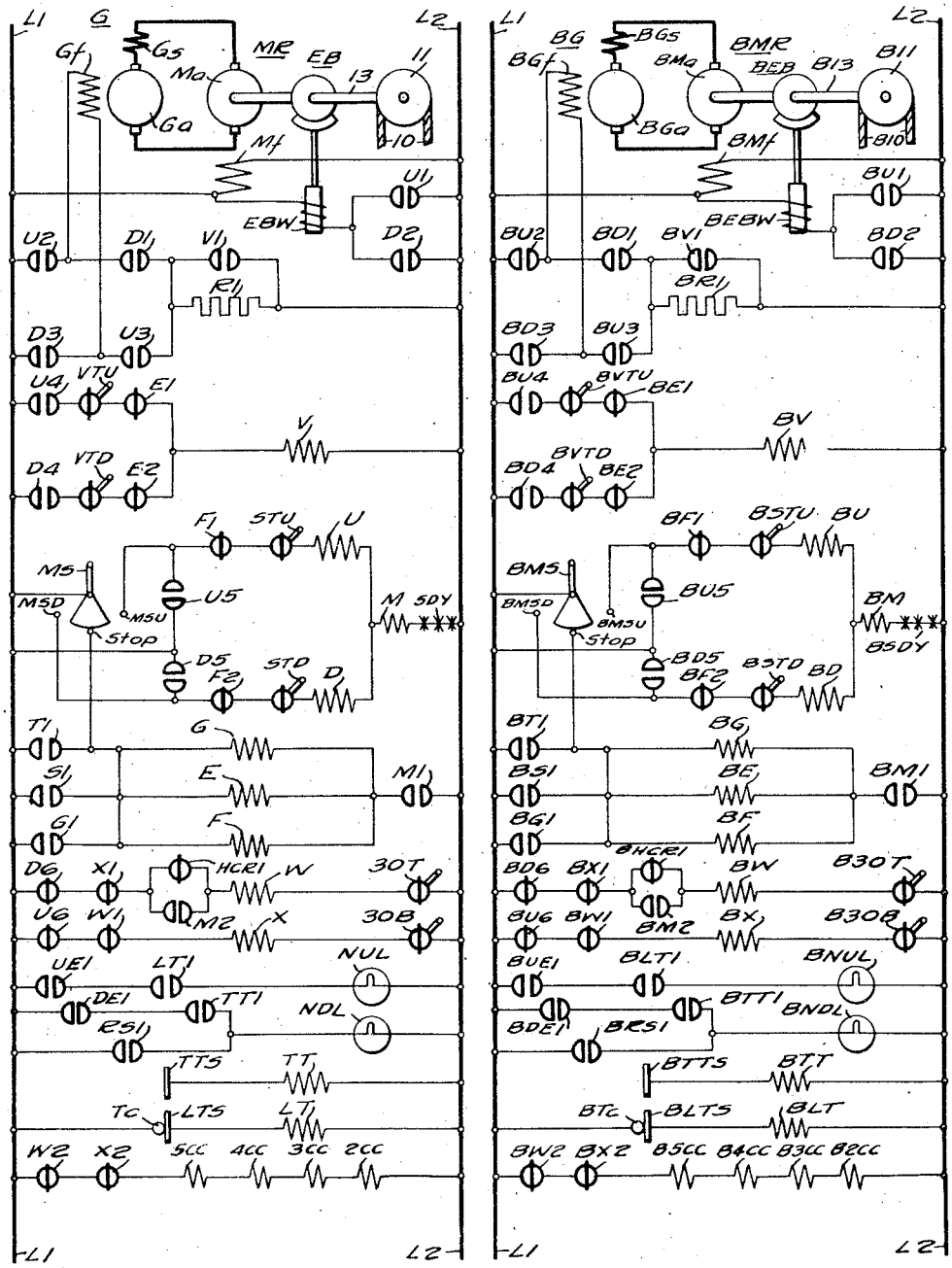
Figure 2A:
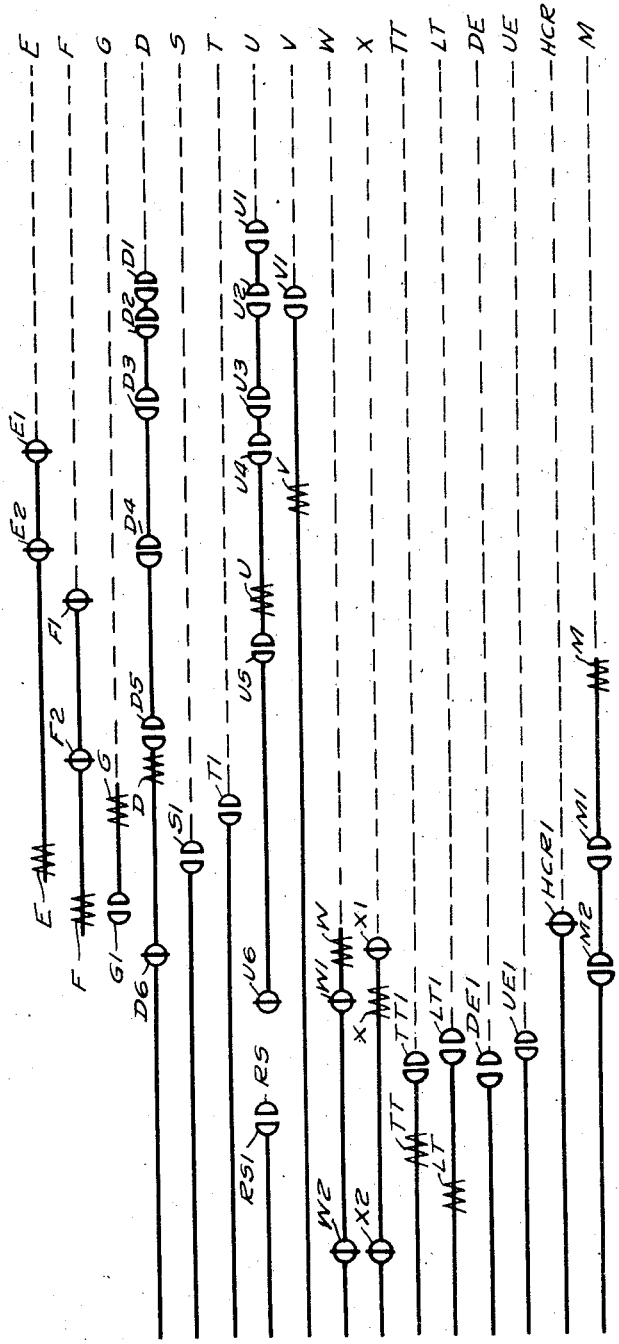

*Apparatus shown in Fig. 2 of the drawings*

Referring particularly to Fig. 2 of the drawings, it will be observed that on the left-hand side, control circuits are shown which are individual to car A. At the right-hand side, the circuits shown are individual to car B.

As shown, the motor MR is provided with an armature Ma which is mechanically connected to the shaft 13 for driving the sheave 11. The brake EB is provided with a winding EBW which is energized on energization of the motor MR. The motor MR includes the usual shunt-type main field winding Mf, which is connected for energization between supply conductors L1 and L2. The armature Ma of motor MR may be energized by means of a generator G which is provided with an armature Ga connected in a loop circuit with the armature Ma. In order to control the direction and magnitude of the voltage generated by the armature Ga, a separately-excited main field winding Gf is provided for the generator G. A field resistor R1 is included in the circuit of field winding Gf in order to provide speed control for the motor MR. The generator G is provided with suitable apparatus for correcting the speed regulation of motor MR, shown for simplicity as a series field winding Gs.

The master switch MS, previously described as located in car A, is here shown connected to selectively control the energization of the operating windings of an up reversing switch U and a down reversing switch D. The reversing switches U and D are provided with contact members, as illustrated, for reversing the connections of the generator field winding Gf to the conductors L1 and L2, depending upon the direction in which it is desired to operate the elevator car. When either the up or the down reversing switch U or D is energized, a brake relay M is also energized to perform functions which will be set forth hereinafter. The common circuit of reversing switches U and D and brake relay M includes the usual safety devices indicated diagrammatically at SDY.

In order to apply the maximum voltage to the main field winding Gf, a high speed relay V is provided, which is energized on energization of either the up or the down reversing switch U or D to short-circuit the resistor R1, connected in series circuit relation with the generator field winding Gf.

A pair of mechanical limit switches VTU and VTD are provided for interrupting the circuit of the high speed relay V when the car reaches a proper slow down point in advance of the upper and lower terminals, respectively, and a pair of stopping limit switches STU and STD are provided for opening the circuits of the reversing switches U and D at the limits, in accordance with the usual practice.

For the purpose of performing certain functions which depend upon the direction of movement of the elevator car, up and down direction preference relays W and X, respectively, are provided. The operating windings of these relays are controlled, respectively, by a limit switch 30T, individual to the top terminal, and a limit switch 30B, individual to the bottom terminal. Each of the limit switches 30T and 30B is arranged to be opened when car A is at the corresponding terminal, thereby interrupting the circuit of the direction preference relay W or X corresponding to the direction approaching the terminal. The direction preference relays W and X are so interlocked that upon opening of one, the other will close.

As set forth hereinbefore, each car is provided with a slow-down inductor switch E and a stopping inductor switch F, the operating coils of which are arranged to be energized on operation of a stopping relay S, (contacts S1 of which only are shown in Fig. 2) and an auxiliary relay G. The stopping relay S is arranged to be operated upon approach of the car A to a floor for which a hall call is registered, as will be set forth hereinafter. Since the stopping relay S is operated only momentarily, the auxiliary relay G is provided for maintaining the energizing circuit for the operating windings of the slow-down and stopping inductor switches E and F.

In addition to the apparatus shown for controlling the inductor relays E and F in response to hall calls, suitable apparatus is provided for controlling these relays in response to car calls registered from within the car A. This apparatus includes an auxiliary stopping relay T, contacts T1 of which are shown in Fig. 2, which serves a function similar to that of stopping relay S, but in response to calls registered within the car.

As mentioned above, next up lamp NUL is provided for indicating to the operator that his car is next to move in the upward direction when the car is at the lower terminal. The next down lamp NDL is provided for indicating that the car is next to leave in the down direction when the car is standing at the upper terminal, and also to indicate that the car is to move downward on an upward trip, in response to operation of the high call reversal apparatus.

An upper terminal relay TT, which is controlled by a floor selector segment TTS and a moving floor selector contact TC, is provided for commutating certain circuits of the system when the corresponding car is at the upper terminal. A lower terminal relay LT is provided for similarly commutating circuits when the car is at the lower terminal.

A plurality of car button reset coils 5CC, 4CC, 3CC and 2CC are provided for resetting the car call push buttons (described hereinafter in connection with Fig. 6) at the end of each trip in the upward or downward direction. The car button resetting coils 5CC, etc., are normally deenergized and are energized only momentarily when the car is arriving at the upper or lower terminal.

Figure 3:
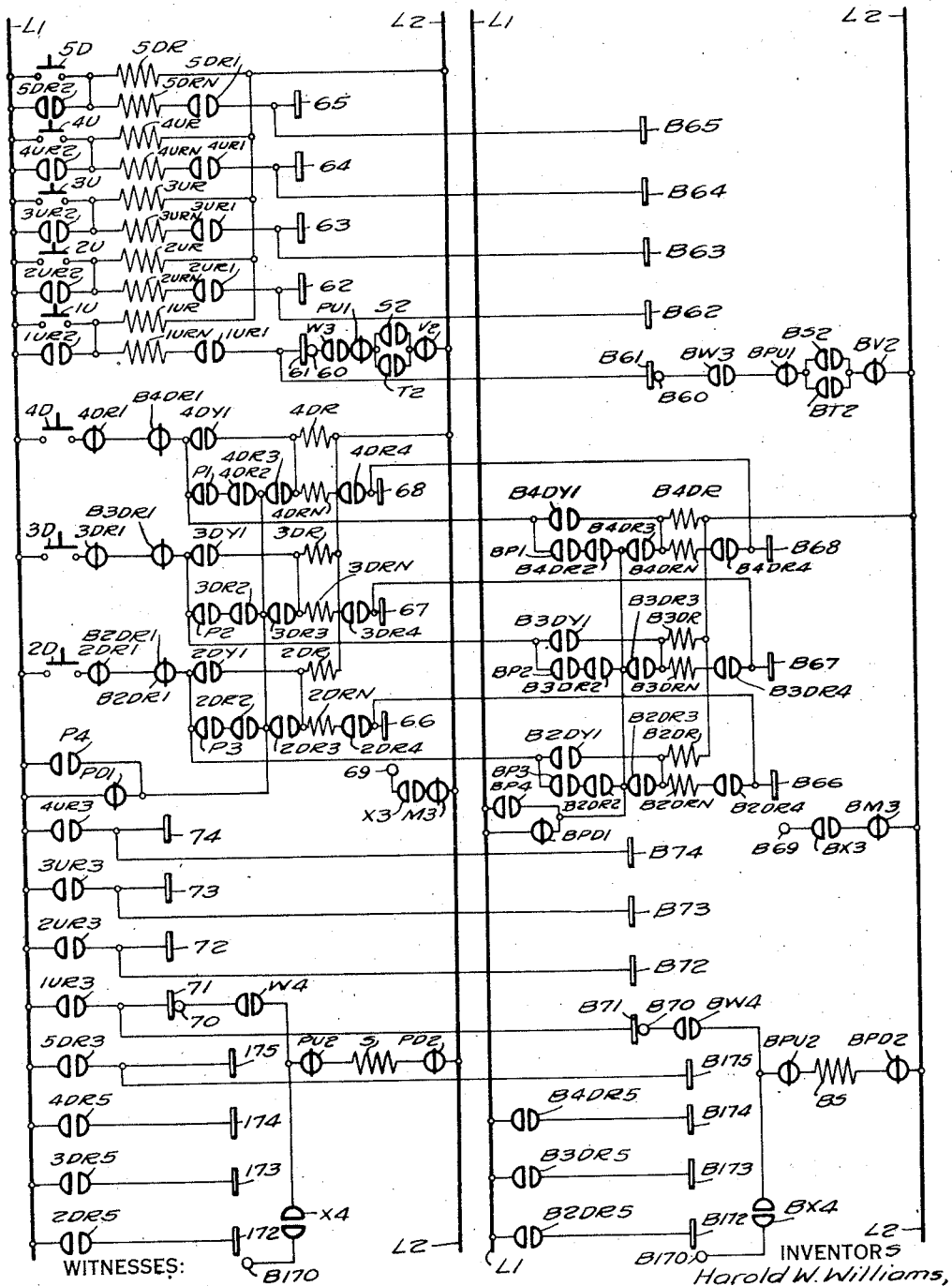

*Apparatus shown in Fig. 3 of the drawings*

An upper terminal call storing relay 5DR, which is energized by means of a call button 5D located at the upper floor, is provided for registering corridor calls for service at the upper terminal, and a plurality of up call storing relays 4UR, 3UR, 2UR and 1UR, which similarly respond to operation of push buttons 4U, 3U, 2U and 1U, are provided for registering calls for service at the floors of corresponding number.

The upper terminal call storing relay 5DR is so designed that its contacts operate in response to energization of its main operating coil, indicated by the reference character 5DR, and remain operated as long as the operating coil 5DR remains energized, provided that a neutralizing coil 5DRN of the relay remains deenergized. If, while the operating coil 5DR is energized, the neutralizing coil 5DRN also becomes energized, the closing force of the operating coil 5DR is overcome by the opposing force of the neutralizing coil 5DRN, and the relay contacts are all restored to non-operated condition. Similarly, interruption of the circuit of the operating coil 5DR, when the neutralizing coil 5DRN is deenergized, will restore the relay contacts to non-operated condition. The up call storing relays 4UR, 3UR, etc., are of similar construction to the upper terminal call relay 5DR. The neutralizing coils 5DRN, etc. are controlled by floor selector segments 65, etc., and a moving selector brush 60, in such manner that the neutralizing coils 5DRN, etc. can only be energized when a car is standing at the corresponding floor.

A plurality of down call storing relays 4DR, 3DR and 2DR, are provided for registering calls for service in the down direction. The down call storing relays 4DR, etc., are similar in construction to the up call storing relays 4UR, 3UR, etc., but are provided in a plurality of groups corresponding to the different cars, whereas the up call storing relays are common to all the cars of the bank. The neutralizing coils 4DRN, etc., of the down call storing relays 4DR, etc., are controlled by selector segments 68, etc. and selector moving contacts 69, etc., of the corresponding individual car in such manner that the neutralizing coils 4DRN, etc., can be energized only when the corresponding individual car is at the floor of the same number as the relay.

The down call storing relays for any one floor, such as relays 4DR and B4DR corresponding to the fourth floor, are interlocked in such a manner that only one can be closed at a time. The circuits for interlocking these relays are controlled by zoning relays which will be hereinafter described in connection with Fig. 4.

Referring to the lower part of Fig. 3, a stopping relay S is provided for engaging an automatic stopping operation of the car as it approaches a floor for which one of the call relays 4UR, etc., 4DR, etc. is operated.

The stopping relay S is controlled by floor selector segments 74, 73, etc., and a selector moving contact 70, in such manner that the relay S may be energized when the corresponding car (car A) is approaching any floor in the upward direction and is slightly more than the slow-down distance in advance of the floor. Selector segments 175, 174, etc., and a selector moving brush 170 provide for similar operation of the stopping relay S when approaching floors in the downward direction.

Figure 4:
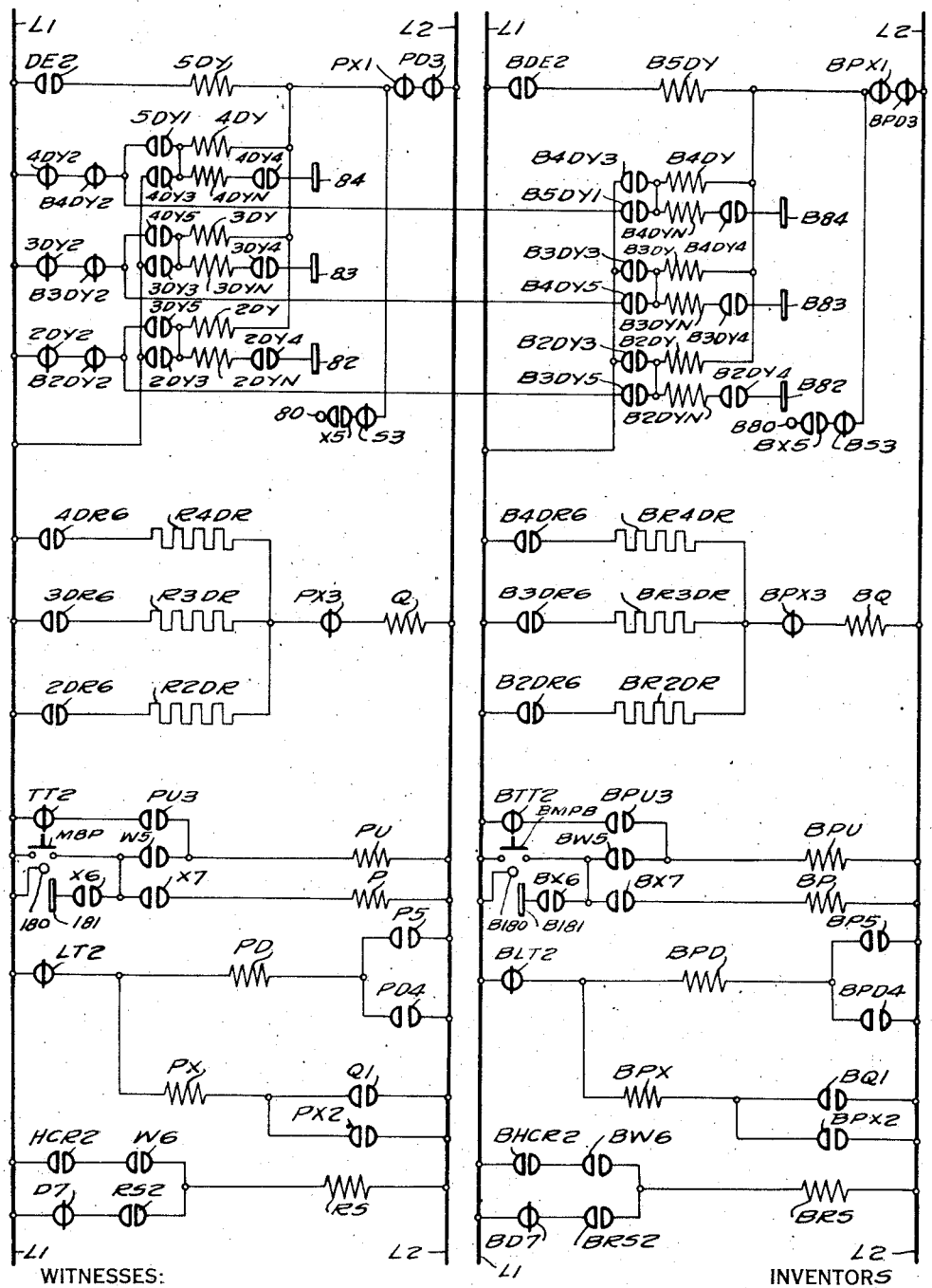
Figure 4A:
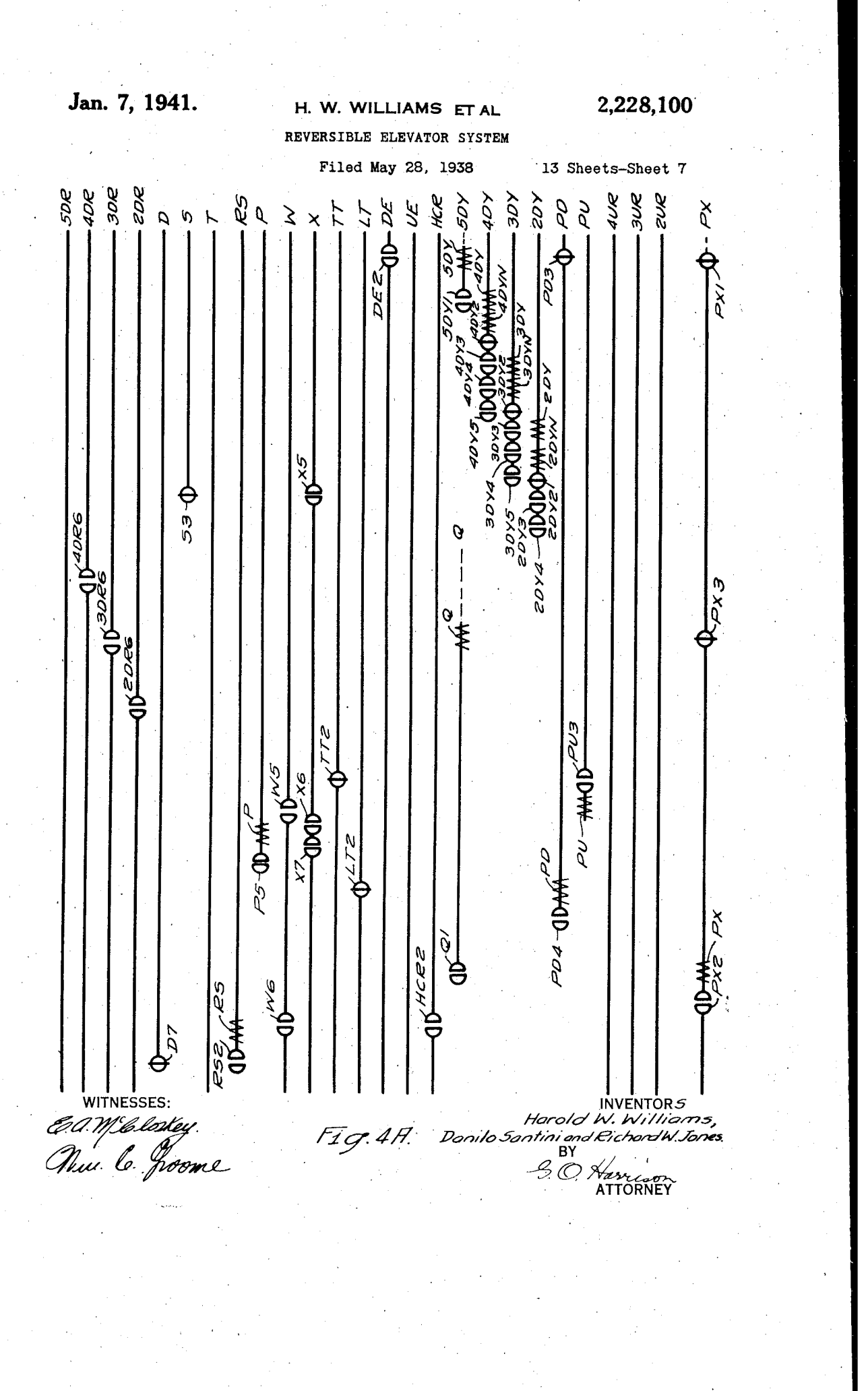

*Apparatus shown in Fig. 4 of the drawings*

A bank of zoning relays 5DY, 4DY, 3DY and 2DY is provided for assigning the zone extending downward from the upper terminal to car A, and a similar bank of zoning relays is provided for each of the other cars of the system. The zoning relay 5DY corresponding to the upper terminal is provided with only one coil and operates its contact to closed position when the coil is energized and to open position when the coil is deenergized in the usual manner. The zoning relays 4DY, 3DY and 2DY for the lower floors, however, are of similar construction to the call relays 4UR, etc., described in connection with Fig. 3. The zoning relays 4DY, 3DY and 2DY are controlled by selector segments 84, 83, etc., and by a selector moving contact 80 in such manner that the corresponding neutralizing coils 4DYN, etc., can be energized only when the corresponding car (car A) is at the floor of equivalent number.

The zoning relays 5DY, 4DY, 3DY and 2DY are so interlocked that upon closure of any relay of the sequence, the relay of next lower number in the sequence is automatically closed. For example, when relay 5DY is closed, it completes a circuit for relay 4DY which closes, and the latter relay completes a circuit for relay 3DY, etc. Each of the relays 4DY, 3DY and 2DY, in closing, however, establishes a holding circuit for itself independent of the contacts of the next preceding relay in the closing sequence.

A quota relay Q is provided for totalizing the number of calls assigned to the individual car A, and for preventing the assignment of further calls thereto when the total exceeds a predetermined number. For this purpose, the quota relay Q is connected to be energized by means of a plurality of branch circuits, each of which includes a quota resistor R4DR, R3DR or R2DR. The number of branch circuits utilized depends upon the number of floors served by the elevator car, and in an actual installation would be quite large, although in the simplified circuit shown only three branch circuits are utilized. In an average elevator installation, the number of calls registered required to operate the quota relay would be of the order of 3 to 10, but in the simplified system shown it will be assumed that two calls constitute the quota of car A. The quota relay Q, accordingly, is designed to remain open as long as only one branch circuit, such as that traversing the quota resistor R4DR is complete, but to close when any two of the branch circuits are completed.

An up pass relay PU is provided for causing car A to pass any car calls registered for the upward direction of car travel when a manual bypass switch MBP, on the car, is operated.

A pass relay P, which is similarly controlled by the manual bypass switch MBP, is provided for causing car A to pass any car calls for the downward direction, when the switch MBP is actuated. The pass relay P also serves to automatically transfer any calls, initially assigned to car A, which for any reason remain unanswered by car A after the latter has left the corresponding floor, to the car having the zone immediately above that of car A, as will hereinafter be explained. This transfer operation is effected by means of a moving selector contact 180 which engages a stationary selector segment 181 when car A is at some point between the second floor and the lower terminal floor.

A down pass relay PD and an auxiliary pass relay PX, which are associated with the up pass relay PU and the pass relay P, are also shown on Fig. 4.

Referring to the lower part of Fig. 4, a reverse signal relay RS is provided for operating the next down lamp NDL (Fig. 2) when car A is at some floor below the upper terminal on an upward trip, and a reversal of direction of car movement is indicated by operation of the high call reverse relay HCR (to be described in connection with Fig. 7).

Figure 5:
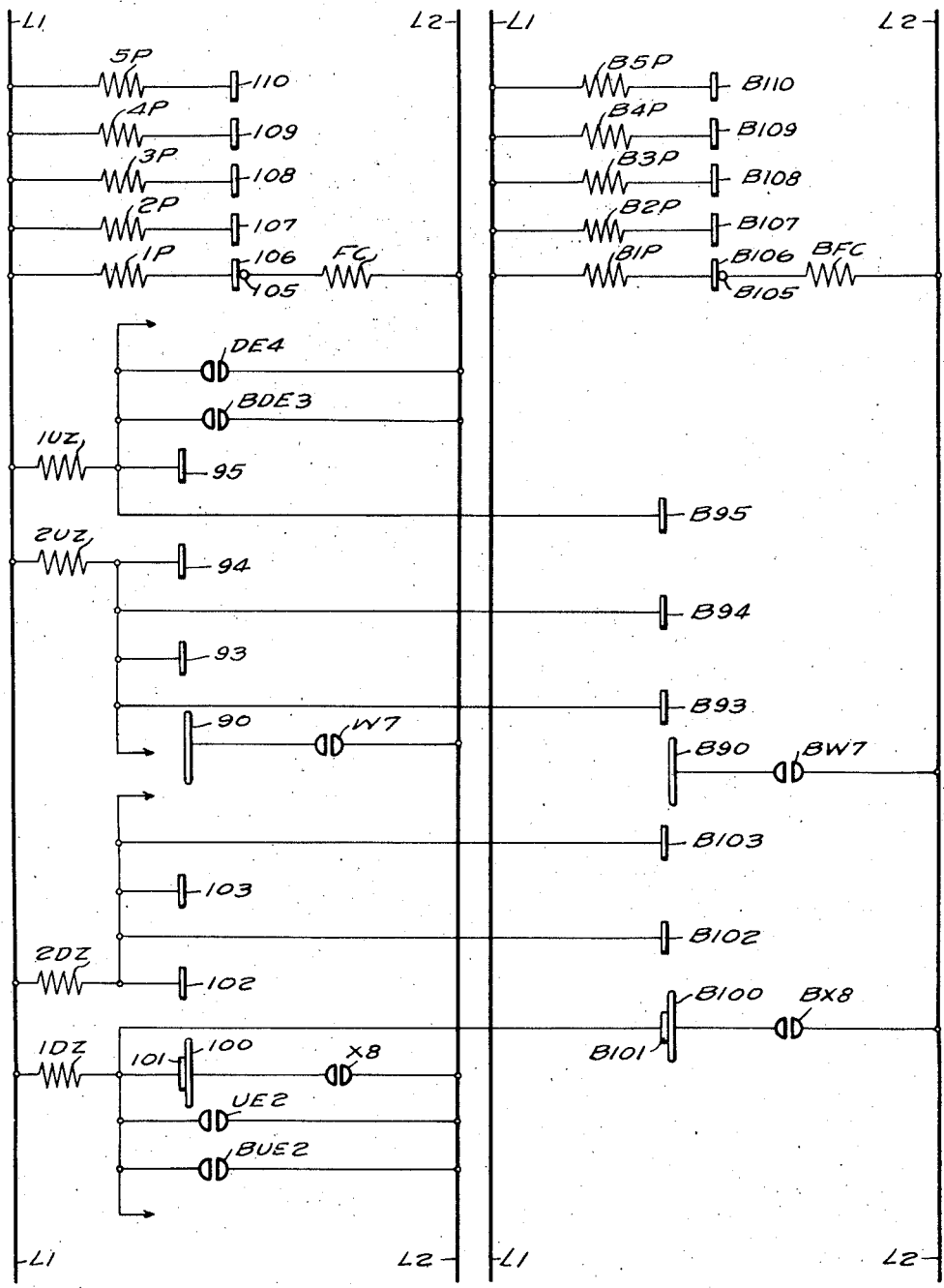

*Apparatus shown in Fig. 5*

A plurality of position relays 5P, 4P, 3P, 2P and IP, controlled by segments and contacts of the floor selector 15 (Fig. 1), is provided for commutating certain car call circuits described in connection with Fig. 6, when the car is at various floors served thereby. The moving contact 105 which successively effects the energization of the position relays IP, 2P, etc., during movement of the car A past the floors of corresponding number, is connected in circuit with a floor counting relay FC, which operates upon each engagement of the moving contact 105 with one of the stationary segments 106, 107, etc., connected to the various position relays IP, 2P, etc.

A pair of down common zoning relays IDZ and 2DZ, and a pair of up common zoning relays IUZ and 2UZ, are provided for controlling the energization of the acceptance relays DE, UE, etc., which will hereinafter be described in connection with Fig. 7. The relays IDZ and 2DZ are controlled in accordance with the position of the car by means of selector moving contacts 90 and 100, in cooperative relationship with stationary floor selector segments 93, 94, etc., and 101, 102, etc., respectively.

Figure 6:
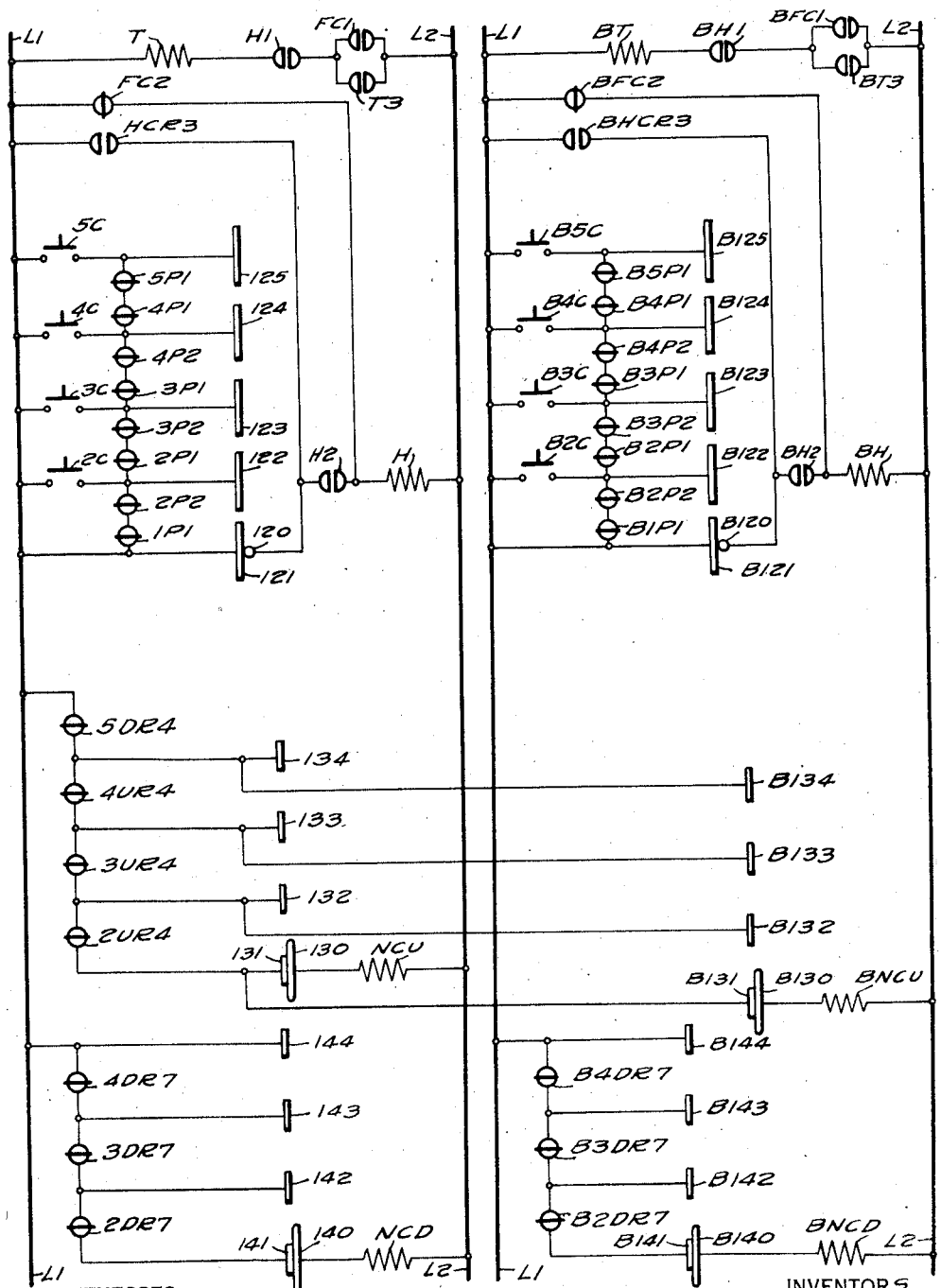
Figure 6A:
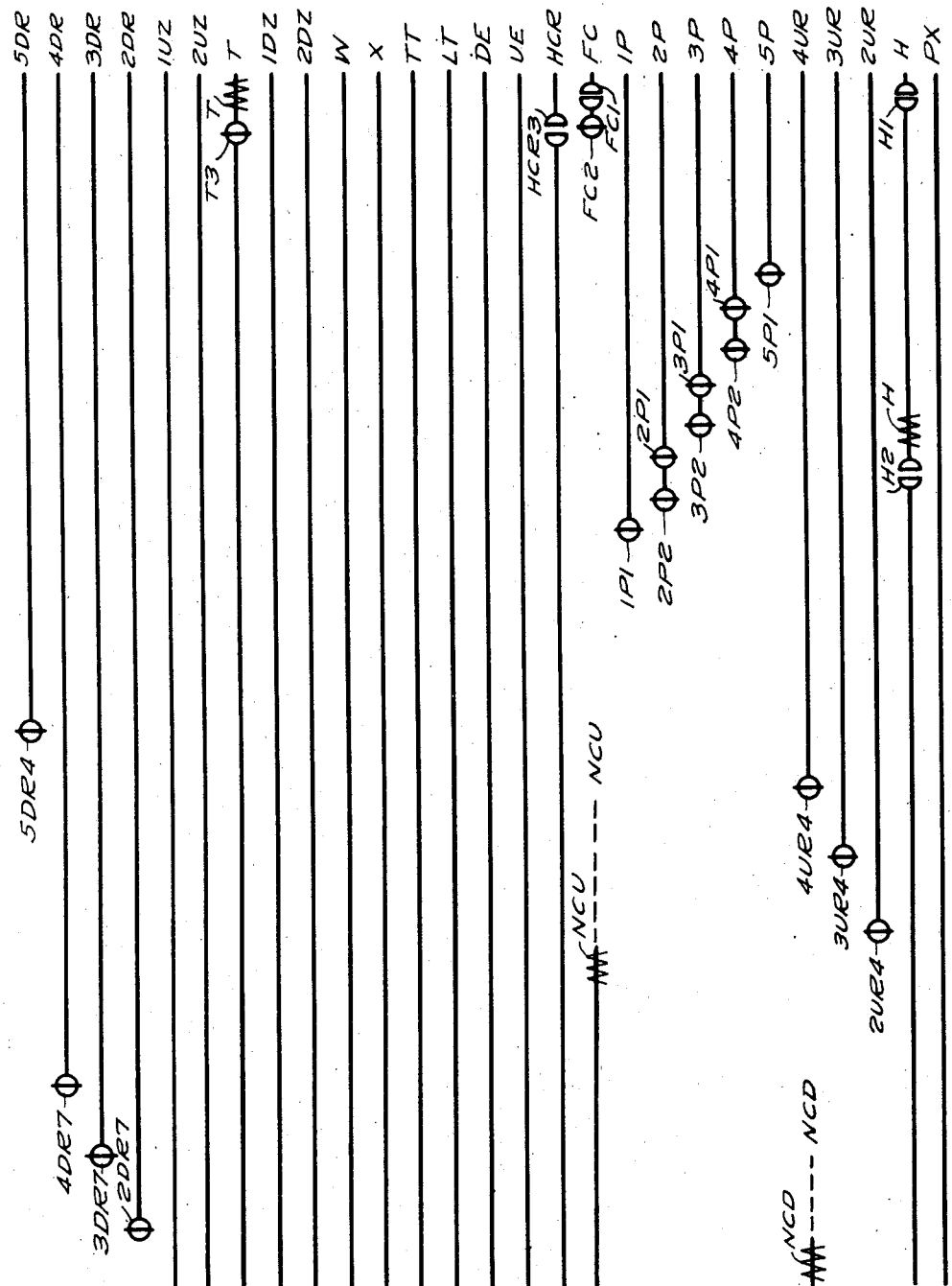

*Apparatus shown in Fig. 6*

The auxiliary stopping relay T, heretofore mentioned in connection with Fig. 2, is shown at the top of Fig. 6. The auxiliary stopping relay T serves a function similar to that of stopping relay S (described in connection with Fig. 3) in initiating operation of the automatic slow down and stopping apparatus upon approach of car A to a calling floor. The auxiliary stopping relay T, however, is controlled in response to car call buttons 5C, 4C, 3C, 2C and IC, which are shown in the upper part of Fig. 6, rather than in response to the call storing relays to which the stopping relay S responds.

The car call buttons 5C, 4C, etc., are of such type that when pressed they automatically latch in closed position, and remain so latched until the corresponding release magnet 5CC, 4CC, etc. (described in connection with Fig. 2), is energized. As the release magnets 5CC, 4CC, etc., are energized momentarily only as the car A is approaching the upper and lower terminals, it will be seen that any operated car button remains in operated condition until the corresponding car approaches the terminal in its direction of car travel.

The car call buttons 5C, 4C, etc., control a plurality of floor selector segments 125, 124, etc., which are engaged succesively by a moving floor selector contact 120 as the car A passes the corresponding floors. The floor selector segments 125, 124, etc., are preferably of greater length than the segments 110, 109, etc., associated with the position relays 5P, 4P, etc., of Fig. 5, in order to provide for energization of the call counting relay H slightly before energization of the position relays 5P, 4P, etc., for the corresponding floor upon approach of the car to the corresponding floor.

The call counting relay H, shown in the upper part of Fig. 6, is controlled by means of back contacts FC2 of the floor counting relay FC, in such manner that it closes each time the floor counting relay FC becomes deenergized. The call counting relay H, accordingly automatically closes and opens as the car passes each floor in the hatchway during travel of the car in either the up direction or the down direction.

A no-call up relay NCU is provided for commutating certain circuits associated with car A, when the latter is in a position in the hatchway such that no up corridor calls for floors in advance of the car in the upward direction are assigned to car A. The no-call up relay NCU is controlled by stationary segments 134, 133, etc., and by a bridging contact member 130 of the floor selector 15 (Fig. 1), and by back contact members 5DR4, 5UR4, etc., of the upper terminal call relay 5DR and the up call relays 4UR, 3UR, etc.

A no-call down relay NCD, which is controlled similarly to the no-call up relay, is provided for commutating certain circuits of car A when no down calls, assigned to car A are registered for floors above the floor at which car A is located. The floor selector moving contact 140, which controls the no-call down relay NCD, is of sufficient length to bridge successive stationary segments 141, 142, etc., and the corresponding moving contact 130, associated with the no-call relay NCU is of similar length.

The no-call up relay NCU and no-call down relay NCD may be utilized to perform any of a number of operations in connection with the control and signal apparatus, depending upon the particular type of elevator system in which they are utilized. In the specific circuit shown, the relays NCU and NCD act through a high call reverse relay HCR (to be described in connection with Fig. 7) to control the automatic stopping of the car at the floor where the highest call assigned thereto is registered, under certain conditions, to prepare for downward operation of the car at the floor where the highest call assigned to the car is registered, and to prepare signals indicative of downward movement of the reversing car.

Figure 7:
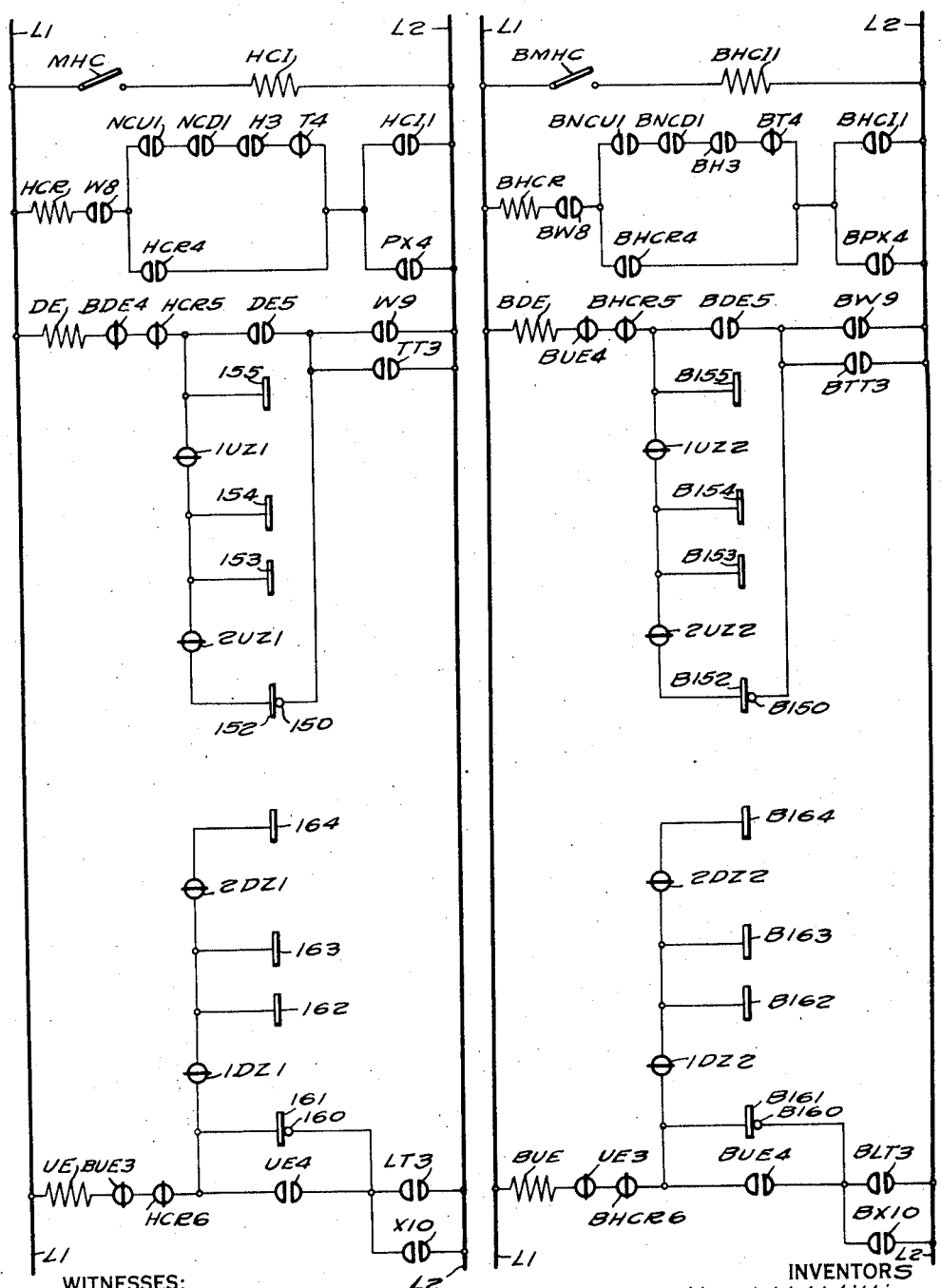
Figure 7A:
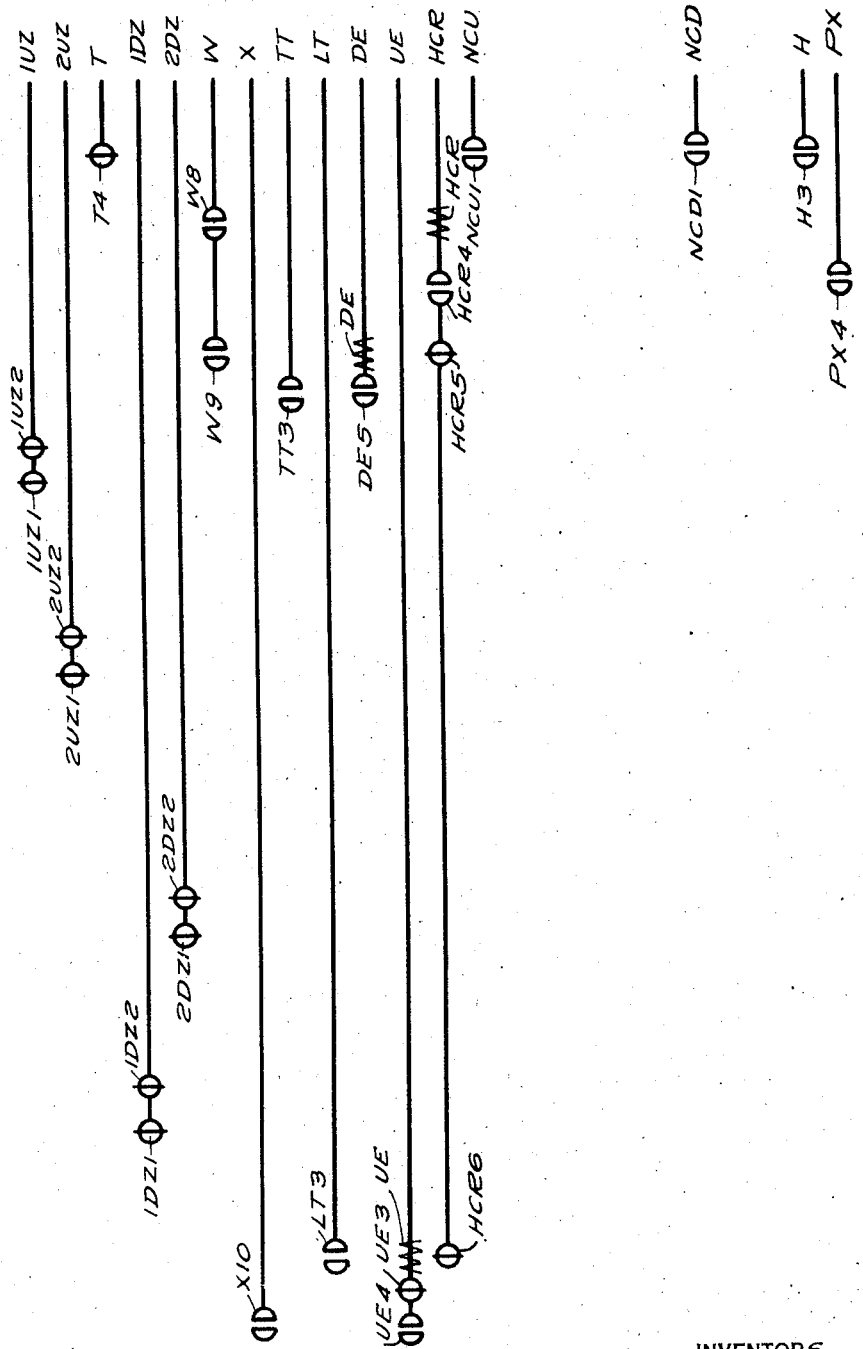

*Apparatus shown in Fig. 7 of the drawings*

Referring to the upper part of Fig. 7, a high call service relay HCI is provided for preparing the circuits of car A so that the car will reverse at the floor corresponding to its highest registered call, whether or not car A has been assigned its quota of two calls. The high call service relay HCI is used principally in the morning or at other times when the elevator traffic is largely incoming, and is controlled by a high call service switch MHC which may be located in the car or at some location convenient to the dispatcher.

In order to effect reversal of car A at the floor corresponding to its highest registered call, when the car has its quota of calls and also when the high call service relay HCI is energized, the high call reverse relay HCR mentioned above is provided. The high call reverse relay HCR can be closed only when car A is traveling in the upward direction or is on an up trip, as indicated by closure of the up direction preference relay W and is controlled by contacts of the no-call up relay NCU, the no-call down relay NCD, the call counting relay H and back contact members of the auxiliary stopping relay T, in a manner which will be hereinafter more fully explained.

The down acceptance relay DE, shown in the upper central part of Fig. 7, is provided for indicating the time at which car A is selected for starting from the upper terminal, and together with the corresponding acceptance relay BDE for car B, prevents both cars A and B from being dispatched from the upper terminal at the same time. The down acceptance relays DE and BDE determine the order of departure of the cars A and B from the upper terminal, in advance of the arrival of either car A or car B at the latter terminal, in accordance with the order in which the two cars enter various zones determined by the common zoning relays IUZ and 2UZ.

A pair of up acceptance relays UE and BUE, similar in function to the down acceptance relay BE and DBE are utilized for determining the order in which the cars A and B are dispatched from the lower terminal.

*Operation of the system*

It will be assumed that initially cars A and B are both standing at the lower terminal, and that the car A was the first to arrive at the latter terminal and has the signal corresponding to energization of the next up lamp NUL, (Fig. 2) indicating that it is the next car to depart in the upward direction. It will also be assumed that no up calls or down calls are initially registered, and that the high call service switches MHC for car A (Fig. 7) and BMHC for car B are both in open position. As car A is standing at the lower terminal, a circuit is completed for the lower terminal relay LT (lower part of Fig. 2) which may be traced as follows:

L1, TC, LTS, LT, L2

In response to completion of this circuit, the lower terminal relay LT closes to effect closure of its contacts LT1 and opening of its back contacts LT2 (Fig. 4), both of which operations are at this time ineffective, and to complete a circuit for the up acceptance circuit UE by means of its contacts LT3 (Fig. 7). The latter circuit may be traced as follows:

L1, UE, BUE3, HCR6, 161, 160, LT3, L2

In response to completion of the latter circuit, the up acceptance relay UE closes to complete a circuit for the next up lamp NUL (Fig. 2) by means of its contact members UE1; to complete a circuit for the down common zoning relay 1DZ (Fig. 5) by means of its contact members UE2; to establish a holding circuit for itself by means of its contact members UE3 (Fig. 7) and to open its back contacts UE4 (Fig. 7) which latter contacts are at this time ineffective. The holding circuit established by the up acceptance relay UE, in closing, may be traced as follows (Fig. 7):

L1, UE, BUE3, HCR6, UE4, LT3, L2

As car A is standing at the lower terminal, a circuit is also completed for the up direction preference relay W (Fig. 2), which may be traced as follows:

L1, D6, X1, HCR1, W, 30T, L2

In response to completion of the latter circuit, the up direction preference relay W closes to effect opening of its contact members W1 (Fig. 2) and W2 (Fig. 2), both of which are at this time ineffective; to effect closure of its contact members W3, W4, W5, W6, W7 and W8, all of which are at this time ineffective to initiate any operation; and to complete a circuit for the down acceptance relay DE by means of its contact members W9 (Fig. 7) which circuit may be traced as follows:

L1, DE, BDE4, HCR5, 1UZ1, 2UZ1, 152, 150, W9, L2

*Car at lower terminal takes down zone*

In response to completion of the circuit for down acceptance relay DE, traced above, the latter relay closes to effect closure of its contact members DE1 (Fig. 2) which are at this time ineffective to initiate an operation; to complete a circuit for the down zoning relay 5DY (Fig. 4) by means of its contact members DE2; to complete a circuit for the up common zoning relay 1UZ by means of its contact members DE4 (Fig. 5); and to establish a holding circuit for itself by means of its contact members DE5 (Fig. 7). The circuit for down zoning relay 5DY (Fig. 4) may be traced as follows:

L1, DE2, 5DY, PX1, PD3, L2

Upon completion of the latter circuit, the down zoning relay 5DY closes to complete a circuit for the down zoning relay 4DY of next lower number in the sequence, which circuit may be traced as follows (Fig. 4):

L1, 4DY2, B4DY2, 5DY1, 4DY, PX1, PD3, L2

The down zoning relay 4DY for the fourth floor, accordingly, closes to establish a holding circuit for itself by means of its contact members 4DY3 (Fig. 4), and to complete a circuit for the down zoning relay 3DY of the next lower number in the sequence, by means of its contact members 4DY5 (Fig. 4). Similarly the down zoning relays 3DY (Fig. 4) and 2DY (Fig. 4) successively close to complete holding circuits for themselves.

As mentioned above, the down acceptance relay DE, in closing, completed a circuit for the up common zoning relay 1UZ (Fig. 5), and the latter relay accordingly operates to energized position, opening its back contact members 1UZ1 (Fig. 7) and 1UZ2 (Fig. 7), both of which are ineffective to perform any operation additional to the preparation of the circuits, at this time.

As car A is standing at the lower terminal, a circuit is also completed for the position relay 1P and the floor counting relay FC (Fig. 5), which circuit may be traced as follows:

L1, 1P, 106, 105, FC, L2

The position relay 1P and the floor counting relay FC accordingly operate to close positions, but both of the latter relays are at this time ineffective to perform any operation additional to the preparation of circuits.

As no up calls are registered at this time, a circuit is completed for the no-call up relay NCU (Fig. 6), which circuit may be traced as follows:

L1, 5DR4, 4UR4, 3UR4, 2UR4, 131, 130, NCU, L2

A similar circuit for the no-call down relay NCD (Fig. 6) is also completed, and both relays NCU and NCD close to prepare the circuit of the high call reverse relay HCR (Fig. 7) for subsequent closure.

In the sequence so far described, cars A and B are both standing at the lower terminal and the following relays and switches are in energized condition:

LT, UE, 1DZ, W, DE, 5DY, 4DY, 3DY, 2DY, 1UZ, 1P, FC, NCU, and NCD

As indicated above, the next up lamp NUL for car A is energized.

*Registration of hall call*

It will be assumed that a prospective passenger at the fourth floor presses the hall button 4D, thereby registering a call for the down direction and completing a circuit for the down call storing relay 4DR (Fig. 3), which circuit may be traced as follows:

L1, 4D, 4DR1, B4DR1, 4DY1, 4DR, L2

The down call storing relay 4DR accordingly closes to open its contacts 4DR1 (Fig. 3); to close its contacts 4DR2 (Fig. 3); to establish a holding circuit for itself by means of its contact members 4DR3 (Fig. 3); to close its contact members 4DR4 and 4DR5 (Fig. 3); to register a call on the quota relay Q by means of its contact members 4DR6 (Fig. 4); and to drop out the no-call down relay NCD (Fig. 6) by means of its contact members 4DR7. The holding circuit for down call relay 4DR established by closure of its contact members 4DR3 (Fig. 3) may be traced as follows:

L1, PD1, 4DR3, 4DR, L2

*Starting of car*

The operator of car A having the next up signal may start his car in the upward direction by rotating the car switch MS (Fig. 2) in the counter-clockwise direction, thereby causing the car switch segment to engage the contact member MSU to complete a circuit for the up direction switch U and the brake relay M which will be obvious from the figure, and the up direction switch U and brake relay M accordingly close.

The up direction switch U, in closing, establishes an energizing circuit for the brake release winding EBW (Fig. 2) by means of its contacts U1; completes a circuit for the main generator field winding Gf in series with the accelerating resistor R1 by means of its contacts U2 and U3 (Fig. 2); and completes a circuit for the high speed relay V (Fig. 2) by means of its contact U4.

The brake relay M, in closing, prepares the common circuit of auxiliary relay G and inductor relays E and F (Fig. 2) for subsequent energization, by means of its contact members M1; closes its contact members M2 in the circuit of up direction preference relay W (Fig. 2); and opens its contact members M3 (Fig. 3), which latter contacts at this time have no effect except in the preparation of circuits.

As mentioned above, in response to closure of the up direction switch U, a circuit is completed for the high speed relay V, and the latter relay accordingly closes. The high speed relay V, in closing, establishes a short circuit around the accelerating resistor R1 (Fig. 2), by means of its contacts V1, thereby causing the elevator motor to accelerate to full speed; and opens its back contacts V2 (Fig. 3), which latter contacts are ineffective at this time.

In response to energization of the main generator field winding Gf and the short circuiting of the accelerating resistor R1, the generator G builds up voltage at a rate dependent on the resistance and inductance of the field winding Gf, the motor M starts and accelerates, and the car A leaves the lower terminal.

As car A leaves the lower terminal, the common circuit of position relay 1P and floor counting relay FC (Fig. 5) is interrupted and the latter two relays operate to deenergized position. The floor counting relay FC, in dropping out, completes a circuit for the call counting relay H (Fig. 6), and the latter relay operates to closed position, closing its contact members H1 in the circuit of auxiliary stopping relay T (Fig. 6) and closes its contacts H2 in its own holding circuit (Fig. 6). However, as the contact members FC1 of the floor counting relay FC are open, the closure of contacts H1 is ineffective to complete a circuit for the auxiliary stopping relay T. Similarly, the holding circuit of call counting relay H is open as all of the car call buttons 5C, 4C, etc., are open, as are the contacts HCR3 (Fig. 6) of the high call reverse relay HCR. The closure of contacts H2, accordingly, is ineffective to establish a holding circuit for the call counting relay H at this time.

In response to movement of car A away from the lower terminal, the circuit of lower terminal relay LT (Fig. 2) is also interrupted and the lower terminal relay LT drops out. The relay LT, in dropping out, opens the circuit of the next up lamp NUL (Fig. 2) by means of its contacts LT1; and also opens the circuit of up acceptance relay UE (Fig. 7) by means of its contacts LT3, and up acceptance relay UE for car A, accordingly, drops out.

The up acceptance relay UE for car A, in dropping out, opens its contacts UE1 in the circuit of next up lamp NUL (Fig. 2); opens the circuit of down common zoning relay 1DZ (Fig. 5) by means of its contacts UE2; and completes a circuit for the up acceptance relay BUE for car B (Fig. 7) by means of its contacts UE3. As the circuit of up acceptance relay BUE is similar to that of the corresponding relay UE for car A, traced above, it will be readily understood from the figure without description.

The up acceptance relay BUE, in closing, completes a circuit for the next up lamp BNUL for car B (Fig. 2); completes a circuit for the down common zoning relay 1DZ (Fig. 5) by means of its contacts BUE2; opens its contacts BUE3 in the circuit of up acceptance relay UE (Fig. 7); and establishes a holding circuit for itself by means of its contacts BUE4 (Fig. 7).

*Upward movement of car in hatchway*

As car A approaches the second floor in its upward movement, a circuit is completed for the position relay 2P and for the floor counting relay FC (Fig. 5) similar to that traced above for the first floor, and the relays 2P and FC operate to energized position. The relay FC, in operating, opens the circuit of the call counting relay H (Fig. 6) by means of its contacts FC1, and the call counting relay H momentarily opens.

As car A continues its movement past the second floor, the common circuit for car position relay 2P and floor counting relay FC (Fig. 5) is opened, and the floor counting relay FC again becomes deenergized to complete a circuit for the call counting relay H (Fig. 6), causing the latter relay to reclose.

As car A approaches the third floor in its upward movement, a common circuit is completed for the car position relay 3P and the floor counting relay FC (Fig. 5), and the latter two relays close. The floor counting relay FC, in closing, again interrupts the circuit of the call counting relay H, thereby causing the latter relay to again drop out.

The approach of car A to the third floor also effects engagement of the moving contact brush 90 with the stationary floor selector segment 93 (Fig. 5) thereby completing a circuit for the up common zoning relay 2UZ, which circuit may be traced as follows (Fig. 5):

L1, 2UZ, 93, 90, W7, L2

*Operation of quota relay*

Assuming that a prospective passenger at the second floor now enters a down call for service by operation of the button 2D, a circuit is completed for the down call storing relay 2DR (Fig. 3) and the latter relay closes to perform the various operations specified for the relay 4DR under the heading "Registration of hall call" above. The down call relay 2DR, in closing, completes a second branch of the circuit of quota relay Q (Fig. 4) by means of its contacts 2DR6, thereby causing the quota relay Q to close. The quota relay Q, in closing, completes a circuit for the pass relay PX (Fig. 4), which circuit may be traced as follows:

L1, LT2, PX, Q1, L2

In response to completion of the latter circuit the auxiliary pass relay PX operates to open the common circuit of all of the down zoning relays 5DY, 4DY, 3DY and 2DY for car A, by means of its contacts PX1 (Fig. 4); to complete a holding circuit for itself by means of its contacts PX2 (Fig. 4); to open the circuit of quota relay Q (Fig. 4) by means of its back contacts PX3; and to prepare the circuit of high call reverse relay HCR (Fig. 7) for subsequent energization by means of its contacts PX4.

*Operation of high call reverse relay*

As car A leaves the third floor in its upward movement the common circuit of position relay 3P and floor counting relay FC (Fig. 5) is opened, and floor counting relay FC drops out to again complete the circuit of call counting relay H (Fig. 6), which latter relay again closes. The call counting relay H, in closing, prepares a holding circuit for itself by means of its contacts H2 (Fig. 6); prepares the circuit of auxiliary stopping relay T (Fig. 6) by means of its contacts H1; and prepares the circuit of high call reverse relay HCR (Fig. 7) by means of its contacts H3.

As car A continues its upward movement from the third floor, the moving contact brush 149 (Fig. 6) engages the stationary segment 144, thereby completing a circuit for the no-call down relay NCD to effect closure of the latter. The no-call down relay NCD, in closing, completes a circuit for the high call reverse relay HCR, which circuit may be traced as follows (Fig. 7):

L1, HCR, W9, NCU1, NCD1, H3, T4, PX4, L2

Upon completion of its circuit traced above, the high call reverse relay HCR closes to open its back contacts HCR1 (Fig. 2) in the circuit of up direction preference relay W; to complete a circuit for the reverse signal relay RS (Fig. 4) by means of its contacts HCR2; to complete the holding circuit for the call counting relay H (Fig. 6) by means of its contacts HCR3; to complete a holding circuit for itself by means of its contacts HCR4 (Fig. 7); to drop out the down acceptance relay DE (Fig. 7) by means of its contacts HCR5; and to open its contacts HCR6 in the circuit of up acceptance relay UE (Fig. 7).

The reverse signal relay RS, in closing, responsive to operation of the high call reverse relay HCR, completes a circuit for the next down lamp NDL of car A (Fig. 2) by means of its contacts RS1; and establishes a holding circuit for itself by means of its contacts RS2 (Fig. 4).

The down acceptance relay DE, in opening in response to closure of the high call reverse relay HCR interrupts the circuit of the up common zoning relay 1UZ (Fig. 5) by means of its contacts DE4, and the relay 1UZ drops out to complete a closing circuit for the down acceptance relay BDE of car B by means of its contacts 1UZ2, which circuit may be traced as follows (Fig. 7):

L1, BDE, BUE4, BHCR5, 1UZ2, 2UZ2, BW9, L2

*Transfer of zone lost by reversing car*

The down acceptance relay BDE, in closing, prepares a circuit for the subsequent energization of next down light BNDL (Fig. 2), by means of its contacts BDE1; completes a circuit for the down zoning relay BDY5 (Fig. 4) by means of its contacts BDE2; completes a circuit for the up common zoning relay 1UZ by means of its contacts BDE3 (Fig. 5); and completes a holding circuit for itself by means of its contacts BDE5 (Fig. 7).

The down zoning relay B5DY, in closing, in response to closure of the down acceptance relay BDE, completes a circuit for the down zoning relay B4DY (Fig. 4) for the next lower floor in the group, and the down zoning relays B3DY and B2DY close in sequence as described above under the heading "Car at lower terminal takes down zone."

*Automatic stopping of car with quota at high call*

As car A continues its upward movement, a circuit is completed for the position relay 4P and for the floor counting relay FC, and the latter two relays close. The floor counting relay FC, in closing, completes a circuit for the auxiliary stopping relay T (Fig. 6) by means of its contacts FC1, and the auxiliary stopping relay T accordingly closes.

The auxiliary stopping relay T, in closing, completes a circuit for the auxiliary relay G, the slow-down inductor relay E and the stopping inductor relay F by means of its contacts T1 (Fig. 2); closes its contacts T2 (Fig. 3); completes a holding circuit for itself by means of its contacts T3 (Fig. 6); and opens its back contacts T4 (Fig. 7), which latter are ineffective at this time.

As the coils of inductor relays E and F are now energized, the latter relays are in condition to open their contacts upon approach to the inductor plates for the fourth floor, mounted in the elevator hatchway at proper slow-down and stopping distances in advance of the fourth floor. As car A arrives at the proper slow-down distance in advance of the fourth floor, the slow-down inductor plate for the fourth floor completes the magnetic circuit for the inductor relay E, and the latter relay opens its contacts E1 (Fig. 2) to interrupt the circuit of the high speed relay V and thereby cause the latter relay to open. The high speed relay V, in opening, opens its front contacts V1 (Fig. 2), thereby inserting the accelerating resistor R1 in series with the generator field winding Gf; and closes its back contacts V2 (Fig. 3) which are at this time ineffective. In response to insertion of the accelerating resistor R1 in the field circuit of the generator G the voltage of the latter generator and the speed of the motor M decrease to values suitable for automatic landing of the elevator car.

As car A reaches a position where its platform is a few inches in advance of the fourth floor, the magnetic circuit of the stopping inductor relay F (Fig. 2) is similarly completed and the other relay opens to interrupt the common energizing circuit of the up direction switch U and brake relay M. The up direction switch U, accordingly, drops out to interrupt the circuit of the brake release winding EBW (Fig. 2) and to open the circuit of the main generator field winding Gf. The brake relay M, in opening, interrupts the common circuit of the auxiliary relay G and the inductor relays E and F (Fig. 2) and also opens the circuit of the up direction preference relay W, to thereby cause the latter relay to drop out.

The up direction preference relay W, in opening, completes a circuit for the down direction preference relay X (Fig. 2) by means of its contacts W1; momentarily completes a circuit for the push button release magnets 5CC, 4CC, etc., (Fig. 2); opens the circuit for the up common zoning relay 2UZ (Fig. 5) by means of its contacts W7; and opens the circuit of the high call reverse relay HCR (Fig. 7) by means of its contacts W8.

The high call reverse relay HCR, accordingly, drops out to interrupt the circuit of the call counting relay H (Fig. 6), and the latter relay, in turn, opens to interrupt the circuit of the auxiliary stopping relay T (Fig. 6). The up direction preference relay W, in dropping out, also opens its contacts W3, W4, W5 and W6, all of which are at this time ineffective.

In response to completion of an energizing circuit for the down direction preference relay X, (Fig. 2), upon opening of the up direction preference relay W, the former relay closes. The down direction preference relay X, in closing, completes a circuit for the demagnetizing winding 4DRN of the down call storing relay 4DR (Fig. 3) for car A and the fourth floor. The latter circuit may be traced as follows:

L1, PD1, 4DR3, 4DRN, 4DR4, 68, 69, X3, M3, L2

In response to completion of this circuit, the call storing relay 4DR drops out.

Registration of up hall call

It will be assumed that a prospective passenger at the third floor, desiring to travel upward, operates the push button 3U (Fig. 3) and thereby completes a circuit for the up call storing relay 3UR, which latter circuit may be traced as follows:

L1, 3U, 3UR, L2

In response to completion of the latter circuit, the up call relay 3UR closes to effect closure of its contacts 3UR1 (Fig. 3) which are at this time ineffective; to complete a holding circuit for itself by means of contacts 3UR2 (Fig. 3); to prepare a circuit for stopping relay S or BS by means of its contacts 3UR3 (Fig. 3); and to open its back contacts 3UR4 (Fig. 6) to thereby interrupt the circuit of the no-call up relay BNCU of car B. The no-call up relay BNCU accordingly opens.

Car B leaves lower terminal

It will be recalled that car B is now standing at the lower terminal and that the following relays and switches associated therewith are in closing position: BLT, BW, B1P, BFC, BNCD and BUE. The next up lamp BNUL for car B is energized, and the no-call up relay BNCU is open.

In order to start car B upward, the operator rotates the master switch MS (Fig. 2) counter-clockwise to complete a common circuit for the up direction switch BU and the brake relay BM, which circuit will be apparent from the figure. In response to closure of the up direction switch BU, the accelerating relay BV closes to accelerate the motor BN to high speed, and car B leaves the lower terminal.

As car B leaves the lower terminal, the common circuit of position relay B1P and floor counting relay BFC (upper part of Fig. 5) is interrupted and the latter two relays drop out. The floor counting relay BFC, in dropping out, completes a circuit for the call counting relay BH, similar to that described above in connection with the call counting relay H associated with car A.

In response to departure of car B from the lower terminal, the circuit of the lower terminal relay BLT (lower part of Fig. 2) is also interrupted and the latter relay drops out. The lower terminal relay BLT, in dropping out, opens the energizing circuit of the next up lamp BNUL (Fig. 2) and interrupts the circuit of the up acceptance relay BUE (Fig. 7) to cause the latter relay to drop out. The up acceptance relay BUE, in dropping out, interrupts the circuit of the down zoning relay 1DZ (Fig. 5) and the latter relay drops out to complete a circuit for the up acceptance relay UE for car A (Fig. 7). The circuit for the up acceptance relay UE may be traced as follows:

L1, UE, BUE3, HCR6, 1DZ1,
     2DZ1, 164, 160, X10, L2

Upon completion of the latter circuit, the relay UE closes to again establish the circuit of the down common zone relay 1DZ (Fig. 5) and to complete a holding circuit for itself by means of its contacts UE4, (Fig. 7).

As car B approaches the second floor a circuit is completed for the position relay B2P and for the floor counting relay BFC (upper part of Fig. 5) which circuit is obvious from the figure. The position relay B2P and the floor counting relay BFC accordingly become energized, and the latter relay momentarily interrupts the circuit of the call counting relay BH.

As car B leaves the second floor, the common circuit of the position relay B2P and the floor counting relay BFC is interrupted, and the circuit for the call counting relay BH is again completed.

As car B continues its upward movement from the second floor, the moving contact brush 130 engages the stationary contact segment B133 (Fig. 6), thereby completing a circuit for the no-call up relay BNCU for car B, which circuit will be obvious from that traced above in connection with the no-call up relay NCU. The no-call up relay BNCU closes its contacts BNCU1 (Fig. 7) in the circuit of the high call reverse relay BHCR, but the latter relay does not close at this time, as its circuit is open at contacts BPX4 of the pass relay BPX, inasmuch as car B does not have its quota at this time.

Normal automatic stop on upward trip

As car B approaches the third floor in its upward movement, a common circuit for the position relay B3P and the floor counting relay BFC is completed, and the circuit of the call counting relay BH is again interrupted. The upward movement of car B also completes a circuit for the common zoning relay 2UZ (Fig. 5), which circuit will be obvious from the figure.

Referring to Fig. 3, as car B approaches the third floor a circuit is completed for the stopping relay BS as follows:

L1, 3UR3, B73, B70, BW4, BPU2, BS, BPD2, L2

Upon completion of the latter circuit the stopping relay BS closes to complete a common energizing circuit for the auxiliary relay BG and for the slow-down inductor relay BE and stopping inductor relay BF.

As car B reaches the slow-down point, somewhat in advance of the third floor, the slow-down inductor relay BE operates to open the circuit of the high speed relay BV (Fig. 2) to thereby effect deceleration of the car B. Similarly, upon further movement of car B toward the third floor landing the stopping inductor relay BF interrupts the common energizing circuit of the up direction switch BU and the brake relay BM, thereby bringing car B to rest at the third floor in a manner described above under the heading "Automatic stopping of car with quota at high call." The brake relay BM, in dropping out interrupts the common energizing circuit of the relays BG, BE and BF.

In the sequence of operations so far described, car A is standing at the fourth floor with its quota of two down calls, one call having been used in bringing the car to rest at the fourth floor, so that the down call at the second floor still remains to be answered. The following relays associated principally with car A are closed UE, 1DZ, FC, NCU, NCD, 2DR, PX, RS, 4P and X. The next down lamp NDL for car A is energized. Car B is standing at the third floor on an up trip, no calls being as yet assigned thereto. The relays 2UZ, BDE, B5DY, B4DY, B3DY, B2DY, BW, BFC, BNCD, BNCU, and B3P are energized.

Registration of car call

The passenger entering car B at the third floor announces the fifth floor as his destination, and the operator accordingly presses the car button B5C (Fig. 6), causing the latter button to close and latch in the closed position. The car button B5C does not complete any circuits at this time but establishes an energizing connection to the floor selector segment B125 (Fig. 6), which segment will effect an automatic stop of the car as will be hereinafter described under the heading "Stop at upper terminal."

In order to start car B in the upward direction from the third floor, the operator again rotates the master switch BMS (Fig. 2) in the counterclockwise direction, thereby again completing the common circuit of the up direction switch BU and the brake relay BN. The high speed relay BV again closes in the manner described above to effect acceleration of car B to full speed.

As car B leaves the third floor, moving in the up direction, the common circuit of the position relay B3P and the floor counting relay BFC (Fig. 5) is interrupted, and a circuit is completed for the call counting relay BH as will be obvious from the above description.

As car B approaches and passes the fourth floor a common circuit is momentarily completed for the position relay B4P and the floor counting relay BFC (Fig. 5) and the latter relays momentarily close, and the call counting relay BH momentarily opens. As car B leaves the fourth floor, the relays B4P and BFC are opened and the call counting relay BH is closed.

As car B advances toward the fifth floor a circuit is completed for the up common zoning relay IUZ (Fig. 5), and the latter relay operates to open the circuit of the up common zoning relay 2UZ, which latter relay accordingly becomes deenergized. Also, referring to Fig. 6, the moving floor selector brush B120 engages the stationary segment B125 thereby completing a holding circuit for the call counting relay BH independent of contacts of the floor counting relay BFC. The latter circuit may be traced as follows:

L1, B5C, B125, B120, BH2, BH, L2

Stop at upper terminal

As car B further approaches the fifth floor, a common energizing circuit is completed for the position relay B5P and the floor counting relay BFC, and the latter relay opens its contacts BFC2 (Fig. 6) in the circuit of call counting relay BH and completes a circuit for the auxiliary stopping relay BT (Fig. 6) by means of its contacts BFC1. Although the contacts BFC1 are now open, the call counting relay BH does not drop out, as its holding circuit, traced above, is still complete.

In response to energization of the auxiliary stopping relay BT, the latter relay closes to complete a common circuit for the auxiliary relay BG and the inductor relays BE and BD (Fig. 2), and as car B further approaches the upper terminal, the high speed relay BV (Fig. 2), the up direction switch BU (Fig. 2) and the brake relay BM (Fig. 2) are opened as described above under the heading "Normal stop on upward trip." The brake relay BM, in opening, interrupts the common circuit of the auxiliary relay BG and the inductor relays BE and BF (Fig. 2).

Upon arrival of the car B at the upper terminal, the upper terminal limit switch B30T (Fig. 2) opens to interrupt the circuit of the up direction preference relay BW, and the latter relay opens. The up direction preference relay BW, in opening, completes a circuit for the down direction preference relay BX (Fig. 2) and momentarily completes a circuit for the release magnets B5CC, B4CC, etc., for the car buttons. As push button B5C (Fig. 6) was previously closed, the energization of release coil B5CC releases the latch (not shown), associated with car button B5C, and the latter button is opened by a suitable spring (not shown), and thereby effects interruption of the circuit of the call counting relay BH. The call counting relay BH, accordingly, drops out to interrupt the circuit of the auxiliary stopping relay BT.

The arrival of car B at the upper terminal also completes a circuit for the upper terminal relay BTT (Fig. 2) as will be obvious from the figure. Upon completion of this circuit, the upper terminal relay BTT closes to effect energization of the next down lamp BNDL (Fig. 2).

Transfer of call by operation of manual by-pass

At this point in the sequence, car A is standing at the fourth floor with its pass relay PX operated in response to its quota of two calls, and with the following additional relays closed: UE, IDZ, FC, IUZ, NCU, NCD, 2DR, RS, 4P and X. The next down lamp NDL for car A is energized. Car B is standing at the upper terminal with no calls registered and with its associated relays BDE, B5DY, B4DY, B3DY, B2DY, BFC, BNCD, BNCU, B5P, BX and BTT in closed position. The next down lamp BNDL of car B is also energized.

It will be assumed that the number of passengers who board car A at the fourth floor is so large that no additional passengers can be accommodated. In this situation, the operator presses the by-pass button MBP (Fig. 4), thereby completing a circuit for the pass relay P which may be traced as follows:

L1, MBP, X1, P, L2

Upon completion of the latter circuit, the pass relay P closes its contacts P1, P2 and P3 (Fig. 3) to prepare transfer circuits for any calls which may be registered on the call relays 4DR, etc., and also completes a temporary holding circuit for any energized call relay by means of its closed contacts P4 (Fig. 3). The pass relay P also completes an energizing circuit for the down pass relay PD (Fig. 4) by means of its contacts P5. Inasmuch as relay 2DR, (Fig. 3) is energized, and its contacts 2DR2 are closed, the closing of the contacts P3 and P4 completes a temporary holding circuit for relay B2DR as follows:

L1, P4, 2DR2, P3, B2DY1, B2DR, L2

In response to completion of the latter circuit, the down call relay B2DR closes to perform operations similar to those specified above under the heading "Registration of hall call."

When the operator of car A releases the manual pass button MBP, the circuit of pass relay P is opened and the latter relay drops out to interrupt the temporary holding circuit for the down call relay 2DR (Fig. 3) traced above, and the latter relay drops out. It will be noted that the opening of relay 2DR completes the transfer of the call at the second floor from car A, to which the call was initially assigned, to car B.

Operation of car in down direction

It will be assumed that car A is started downward from the fourth floor from the upper terminal. During downward movement of car A the relays NCU, NCD, PX, RS, X, D, M, and V are closed, as will readily be understood from the operation so far described. It will be recalled that the operator of car A has operated his bypass button, and that no calls remain assigned to the car. As the intermediate floors are passed, the position relays 4P, 3P and 2P close in sequence, and at the time of each closure, the floor counting relay FC momentarily closes, as will be apparent from the above description. When car A is at intermediate positions between floors, on its downward movement, the call counting relay H is momentarily closed in a manner described above for upward operation. During the time car A is in the zone corresponding to floors 3 and 2, the down common zoning relay 2DZ is energized, and when car A approaches the lower terminal, the down common zoning relay 1DZ becomes energized, and the down common zoning relay 2DZ is in open circuit condition.

The stopping operation of car A at the lower terminal is similar to that described above under the heading "Stop at upper terminal" and will be readily understood from the latter description. Upon arrival of car A at the lower terminal, the circuit of the pass relay PX (Fig. 4) is interrupted by the operation of the contacts LT2 of the lower terminal relay LT, thereby effecting deenergization of the pass relay PX.

It will be recalled that car B is standing at the upper terminal with no calls assigned thereto and that relays BDE, B5DY, B4DY, B3DY, B2DY, BFC, BNCD, BNCU, B5P, BX and BTT, individual to car B, are closed and that the next down lantern NDL is energized. It will also be recalled that up acceptance relay UE, individual to car A is closed, having been closed in response to opening of acceptance relay BUE, as described above under the heading "Car B leaves lower terminal."

It will be assumed that the operator of car B starts the latter car downward from the upper terminal. Upon starting the car B downward, direction switch BD and relays BM and BD (Fig. 2) close in a manner which will be apparent from the description under the heading "Starting of car." As car B leaves the upper terminal, relays B5P, BFC and BTT open, and relay BH closes, as will be apparent from the previous description.

*Normal transfer of zone to following car*

As car B approaches the fourth floor in its downward movement, the circuit is completed for the neutralizing or demagnetizing winding B4DYN (Fig. 4) for the down zoning relay B4DY. The latter circuit may be traced as follows:

L1, B4DY3, B4DYN, B4DY4, B84, B80, BX5, BS3, BPX1, BPD3, L2

In response to completion of the latter circuit, the down zoning relay B4DY opens to effect opening of its contacts B4DY1, (Fig. 3) in the circuit of call relay B4DR; to complete a circuit for the down zoning relay 4DY (Fig. 4) by means of its contacts B4DY2; and to open its contacts B4DY3, B4DY4, and B4DY5 (Fig. 4) which latter are at this time all ineffective. The opening of down zoning relay B4DY and the closure of down zoning relay 4DY effect a transfer of the fourth floor from the zone of car B to the zone of car A, which at this time has the zone extending from the upper terminal downward to the position of car B.

Similarly, as car B passes the third floor the down zoning relay B3DY opens and the down zoning relay 3DY for car A closes, thereby transferring the third floor to the zone of car A.

As car B passes the second floor the circuit for the down zoning relay B2DY of car B for the second floor is similarly opened, and the down zoning relay 2DY for car A closes to assume the second floor as part of the zone of car A.

*Cancellation of calls upon approach to terminal*

After car B passes the second floor in its downward movement and approaches the lower terminal, the floor selector contact brush B180 (Fig. 4) engages the stationary floor selector segment B181, thereby completing a circuit for the pass relay BP, as follows:

L1, B180, B181, BX6, BX7, BP, L2

The pass relay BP accordingly closes, preparing circuits by means of its contacts BP1, BP2, and BP3 (Fig. 3) for transferring any calls which may exist on the call relays of car B to the corresponding relays for car A. The pass relay BP, in closing, also prepares a momentary holding circuit by means of its contacts BP4 (Fig. 4) for maintaining any energized call relays for car B temporarily closed and completes a circuit for the down pass relay BPD by means of its contacts BP5 (Fig. 4).

Upon completion of the latter circuit the down pass relay BPD closes to establish a holding circuit for itself by means of its contacts BPD4 (Fig. 4), which maintains the relay BPD closed until the lower terminal is reached.

*Morning service*

During the peaks of heavy incoming traffic, as in the morning, in most buildings, and in some cases in the latter part of the noon hour, high call reverse operation may be established independently of operation of the quota relays Q and BQ, by closure of the high call service switch MHC. Upon closure of the high call service switch MHC a circuit is completed for the high call service relay HCI (upper part of Fig. 7), which will be obvious from the figure. The high call service relay HCI, when closed, establishes a short circuit around the contacts PX4 (upper part of Fig. 7) of the pass relay PX, which contacts are included in the circuit of the high call reverse relay HCR. Accordingly, when the high call service relay HCI is closed, the high call reverse relay HCR will close when the car A is traveling in the up direction, no up calls or down calls for floors above the position of car A are assigned to the latter car, the call counting relay H3 is closed (as occurs during normal slow-down in response to car calls) and the auxiliary stopping relay T is open. It will be apparent, therefore, that with the high call service switch MHC closed, each car will automatically reverse on upward trips, at the highest floor in advance of itself, at which a down hall call assigned to itself, one of its own car calls, or any common up call, is registered.

We do not intend that the present invention shall be restricted to the specific structural details, arrangement of parts, or circuit connections herein set forth, as various modifications thereof may be effected without departing from the spirit and scope of our invention. We desire, therefore, that only such limitations shall be imposed as are indicated in the appended claims.

We claim as our invention:

1. In an elevator system having an elevator car operable between terminals past a plurality of intermediate floors, control apparatus for said car including direction preference means for preparing for departure of the car in the direction of arrival thereof after a stop at any of said intermediate floors; a plurality of call storing elements for recording desired stops of said car at a plurality of corresponding floors; and means responsive to a totalized effect of the calls recorded on said call storing elements for causing said direction preference means to prepare for reversal of the direction of starting of said car from one of said intermediate floors.

2. In an elevator system having an elevator car operable between terminals past a plurality of intermediate floors, control apparatus for said car including direction preference means for preparing for departure of the car in the direction of arrival thereof after a stop at any of said intermediate floors; means for causing said direction preference means to prepare for reversal of the direction of operation of said car upon stopping of said car at one of said terminals; a plurality of call-storing elements for recording desired stops of said car at a plurality of corresponding floors; and means responsive to a totalized effect of the calls recorded on said call storing elements for causing said direction preference means to prepare for reversal of the direction of operation of said car at one of said intermediate floors.

3. In an elevator system having an elevator car operable between terminals past a plurality of intermediate floors, control apparatus for said car including direction preference means for preparing for departure of the car in the direction of arrival thereof after a stop at any of said intermediate floors; means for causing said direction preference means to prepare for reversal of the direction of operation of said car upon stopping of said car at one of said terminals; a plurality of call-storing elements for recording desired stops of said car at a plurality of corresponding floors; and means responsive to a totalized effect of the calls recorded on said call storing elements for causing said direction preference means; under predetermined conditions, to prepare for reversal of the direction of operation of said car at the floor furthest in advance of said car for which the corresponding call-storing element is operated.

4. In an elevator system having an elevator car operable between terminals past a plurality of intermediate floors, control apparatus for said car including direction preference means for preparing for departure of the car in the direction of arrival thereof after a stop at any of said intermediate floors; means for causing said direction preference means to prepare for reversal of the direction of operation of said car upon stopping of said car at one of said terminals; means for each of said intermediate floors for recording up calls for the corresponding floor; a plurality of call storing elements corresponding to said intermediate floors for recording down calls for the corresponding floors; and means responsive to a totalized effect of the down calls recorded on said call storing elements for causing said direction preference means to prepare for reversal of the direction of operation of said car at one of said intermediate floors.

5. In an elevator system having an elevator car operable between terminals past a plurality of intermediate floors, control apparatus for said car including direction preference means for preparing for departure of the car in the direction of arrival thereof after a stop at any of said intermediate floors; means for causing said direction preference means to prepare for reversal of the direction of operation of said car upon stopping of said car at one of said terminals; means for each of said intermediate floors for recording up calls for the corresponding floor; a plurality of call storing elements corresponding to said intermediate floors for recording down calls for the corresponding floors; and means responsive to a totalized effect of the down calls recorded on said call storing elements, when said car is on an upward trip, for causing said direction preference means to prepare for downward operation of said car from the highest of said intermediate floors for which an up call or a down call is recorded.

6. In an elevator system having a plurality of cars operable between terminals past a plurality of floors, motive apparatus individual to each of said cars; stopping means for each car for controlling the corresponding motive apparatus to cause the car to stop at any selected one of said floors; up and down call assignment apparatus, including a common control element at each of said floors for registering calls for a predetermined direction of car travel, common selection apparatus for all of said cars, and an individual group of call storing elements for each of said cars, each of said groups comprising a plurality of elements, corresponding to said floors for recording desired stops of the corresponding individual car for said predetermined direction of car travel at the corresponding floor, said common selection apparatus being responsive to the position of the cars upon operation of any of said common control elements to select an individual car to answer the call, to record the call on the call storing element for the corresponding floor and the selected individual car, and to prevent the recording of the call on any call storing element for the remainder of said cars; means normally effective to cause said cars to reverse their direction of operation at said terminals; and individual means for each car, responsive to a totalized effect of the down calls recorded on the corresponding individual group of call storing elements, for causing operation of the stopping means for the associated car, when the latter is on an upward trip to effect a stop of said associated car at the highest floor for which an up or down call, other than a call recorded on a call storing element of another of said cars, is recorded by said call assignment apparatus and for conditioning said car for reversal at said stop.

7. In an elevator system having a plurality of cars operable between terminals past a plurality of floors, control apparatus for each of said cars including individual direction preference means for preparing for departure of the corresponding car in the direction of arrival thereof after a stop at any of said intermediate floors; call assignment apparatus including a common control element at each of said floors for registering calls, common selection apparatus, and an individual group of call storing elements for each of said cars, each of said groups comprising a plurality of elements corresponding to said floors for recording calls of the corresponding individual car at the corresponding floor, said common selection apparatus being responsive to the position of the cars upon operation of any of said common control elements to select an individual car to answer the call, to record the call on the call storing element for the corresponding floor and the selected individual car, and to prevent the recording of the call on the call storing elements for the remainder of said cars; individual means for each car, responsive to a totalized effect of the calls recorded on the corresponding individual group of call storing elements, when the associated car is on an upward trip, for causing operation of the corresponding direction preference means to prepare for departure of said associated car in the downward direction from the highest floor for which a call, other than a call recorded on a call storing element of another of said cars, is recorded by said call assignment apparatus.

8. In an elevator system having an elevator car operable between an upper terminal and a lower terminal past a plurality of intermediate floors, signal means effective to selectively provide signals indicative of upward or downward operation of said car; a plurality of call storing elements for recording desired stops of said car at a plurality of said floors; and means effective under predetermined conditions, in response to a totalized effect of the calls recorded on said call storing elements, for rendering said signal means effective, when said car is on an upward trip, to provide a signal indicative of downward movement of said car from one of said intermediate floors.

9. In an elevator system having an elevator car operable between an upper terminal and a lower terminal past a plurality of intermediate floors, signal means in said car effective to selectively provide signals directive of upward or downward movement of said car, a plurality of call storing elements for recording desired stops of said car at a plurality of corresponding floors; means effective under predetermined conditions when said car is at said lower terminal for rendering said signal means effective to provide a signal directive of upward movement of said car; and means effective under predetermined conditions, in response to a totalized effect of the calls recorded on said call storing elements, for rendering said signal means effective, when said car is at one of said intermediate floors on an upward trip, to provide a signal directive of downward movement of said car.

10. In an elevator system having a plurality of cars operable past a plurality of floors, signal means associated with each of said cars, each of said signal means being effective to provide signals selectively indicative of upward or downward operation of said car; up and down call assignment apparatus, including a common control element at each of said floors for registering calls for a predetermined direction of car travel, common selection apparatus for all of said cars, and an individual group of call storing elements for each of said cars, each of said groups comprising a plurality of elements corresponding to said floors for recording desired stops of the corresponding individual car for said predetermined direction of car travel at the corresponding floor, said common selection apparatus being responsive to the position of the cars upon operation of any of said common control elements to select an individual car to answer the call, to record the call on the call storing element for the corresponding floor and the selected individual car, and to prevent the recording of the call on any call storing elements for the remainder of said cars; and individual means for each car, responsive to a totalized effect of the down calls recorded on the corresponding individual group of call storing elements, when the associated car is on an upward trip for causing operation of said signal means for the said associated car to provide a signal indicative of downward operation of said associated car from the highest floor for which any up or down call, other than a call recorded on a call storing element of another of said cars, is recorded by said call assignment apparatus.

11. In an elevator system having a plurality of elevator cars operable between terminals past a plurality of intermediate floors, control apparatus for each of said cars including individual direction preference means for preparing for departure of the corresponding car in the direction of arrival thereof after a stop at any of said intermediate floors; an individual group of call storing elements for each of said cars, each of said groups comprising a plurality of elements each effective to record a desired stop of the corresponding individual car at one of said intermediate floors; means effective when said cars are operated with few recorded calls for causing operation of each of said direction preference means to reverse the direction of travel of the corresponding car at said terminals; and means responsive to a totalized effect of the calls recorded on one of said groups of call storing elements for causing operation of the corresponding direction preference means to reverse the direction of travel of the corresponding one of said cars at one of said intermediate floors.

12. In an elevator system having a plurality of elevator cars operable between terminals past a plurality of intermediate floors, control apparatus for each of said cars including individual direction preference means for preparing for departure of the corresponding car in the direction of arrival thereof after a stop at any of said intermediate floors; an individual group of down call storing elements for each of said cars, each of said groups comprising a plurality of elements each effective to record a desired stop in the downward direction of the corresponding individual car at one of said intermediate floors; means effective when said cars are operated with few recorded down calls for causing operation of each of said direction preference means to reverse the direction of travel of the corresponding car when the latter arrives at the upper of said terminals on an upward trip; and means responsive to a totalized effect of the down calls recorded on one of said groups of call storing elements for causing operation of the corresponding direction preference means to reverse the direction of travel of the corresponding one of said cars when the latter arrives at one of said intermediate floors on an upward trip.

13. In an elevator system having a plurality of elevator cars operable between terminals past a plurality of intermediate floors, control apparatus for each of said cars including individual direction preference means for preparing for departure of the corresponding car in the direction of arrival thereof after a stop at any of said intermediate floors; an individual group of down call storing elements for each of said cars, each of said groups comprising a plurality of elements each effective to record a desired stop in the downward direction of the corresponding individual car at one of said intermediate floors; means effective when a predetermined distribution of down calls recorded by said groups of call storing elements exists for causing operation of each of said direction preference means to reverse the direction of travel of the corresponding car when the latter arrives at the upper of said terminals on an upward trip; and means responsive to a totalized effect of the down calls recorded on one of said groups of call storing elements for causing operation of the corresponding direction preference means to reverse the direction of travel of the corresponding one of said cars when the latter arrives on an upward trip at the one of said intermediate floors corresponding to the highest recorded call assigned to said corresponding one of said cars.

14. In an elevator system having a car operable between terminals in a hatchway past a plurality of intermediate floors, control apparatus for said car including direction preference means for preparing for departure of the car in the direction of arrival thereof after a stop at any of said intermediate floors, signal means for selectively providing signals indicative of upward or downward operation of the car, a plurality of call storing devices for storing desired stops of said car at a plurality of corresponding floors, and means responsive to a totalized effect of the calls stored on said call storing devices for causing said preference means to prepare for reversal of the direction of starting of said car from one of said floors and for operating said signal means to indicate said reversal of the direction of starting of said car.

15. In an elevator system having a car serving a plurality of floors between an upper terminal and a lower terminal, a control means for causing operation of the car, signal means for indicating the direction in which the car should operate, a plurality of control devices associated with the floors for storing stop calls at the floors to be made by the car, direction preference means for normally causing the car to continue its direction of operation from one terminal to the other terminal, a quota device, means responsive to the storing of a predetermined number of stop calls for operating the quota device, and means responsive to operation of the quota device and operation of the car for causing the direction preference means to effect a reversal of the direction of operation of the car at one of said stops and for operating the signal means for indicating the reversal of the direction of operation of the car.

HAROLD W. WILLIAMS.
DANILO SANTINI.
RICHARD W. JONES.